United States Patent
Fujimori et al.

(10) Patent No.: US 7,894,115 B2
(45) Date of Patent: *Feb. 22, 2011

(54) LIGHT CONTROL APPARATUS HAVING LIGHT MODULATING FILM

(75) Inventors: Yoshikazu Fujimori, Kyoto (JP); Tsuyoshi Fujii, Kyoto (JP)

(73) Assignee: Rohm Co., Ltd. (JP)

( * ) Notice: Subject to any disclaimer, the term of this patent is extended or adjusted under 35 U.S.C. 154(b) by 481 days.

This patent is subject to a terminal disclaimer.

(21) Appl. No.: 11/795,781

(22) PCT Filed: Jan. 19, 2006

(86) PCT No.: PCT/JP2006/300754

§ 371 (c)(1), (2), (4) Date: Jul. 20, 2007

(87) PCT Pub. No.: WO2006/077932

PCT Pub. Date: Jul. 27, 2006

(65) Prior Publication Data

US 2008/0107372 A1 May 8, 2008

(30) Foreign Application Priority Data

| Jan. 20, 2005 | (JP) | 2005-012980 |
| Feb. 8, 2005 | (JP) | 2005-031911 |
| Feb. 28, 2005 | (JP) | 2005-053390 |
| Mar. 15, 2005 | (JP) | 2005-073306 |

(51) Int. Cl. *G02F 1/03* (2006.01)

(52) U.S. Cl. ...................... 359/245; 359/237

(58) Field of Classification Search ................. 359/245
See application file for complete search history.

(56) References Cited

U.S. PATENT DOCUMENTS

| 7,372,608 B2 * | 5/2008 | Fujimori | 359/245 |
| 2002/0141031 A1 | 10/2002 | Wang et al. | |
| 2004/0008397 A1 | 1/2004 | Noonan | |
| 2004/0129949 A1 * | 7/2004 | Deliwala et al. | 257/194 |
| 2005/0078716 A1 * | 4/2005 | Liu | 372/6 |
| 2005/0220386 A1 * | 10/2005 | Nakada et al. | 385/1 |

FOREIGN PATENT DOCUMENTS

JP 3-149515 A 6/1991

(Continued)

OTHER PUBLICATIONS

Chinese Office Action for Chinese Patent Application No. 200680000507.0 issued Oct. 31, 2008 with English Translation.

International Preliminary Report on Patentability for International Application No. PCT/JP2006/300754 mailed Jul. 24, 2007.

(Continued)

*Primary Examiner*—Jordan M. Schwartz
*Assistant Examiner*—James C Jones
(74) *Attorney, Agent, or Firm*—Cantor Colburn LLP

(57) ABSTRACT

A light control apparatus may include a substrate, a first reflection layer provided on the substrate, a light modulating film provided on the first reflection layer, a second reflection layer provided on the light modulating film, and a pair of electrodes which applies an electric field to the light modulating film. The light modulating film ma have a refractive index controlled by the electric field.

20 Claims, 14 Drawing Sheets

FOREIGN PATENT DOCUMENTS

| | | |
|---|---|---|
| JP | 5-257103 | 10/1993 |
| JP | 6-265832 A | 9/1994 |
| JP | 7-146657 | 6/1995 |
| JP | 9-520813 T | 3/1997 |
| JP | 11-52404 A | 2/1999 |
| JP | 11-160662 | 6/1999 |
| JP | 2000-164817 A | 6/2000 |
| JP | 2000-182653 A | 6/2000 |
| JP | 2001-51310 | 2/2001 |
| JP | 2001-337303 A | 12/2001 |
| JP | 2002-297008 | 10/2002 |
| JP | 2003-22052 A | 1/2003 |
| JP | 2003-279914 | 10/2003 |
| JP | 2003-344621 A | 12/2003 |
| JP | 2004-287215 A | 10/2004 |
| WO | 95/06272 | 3/1995 |
| WO | 00/45202 A | 8/2000 |
| WO | 03/044591 | 5/2003 |
| WO | WO 03/044591 A1 | 5/2003 |
| WO | 2004/111717 A1 | 12/2004 |

OTHER PUBLICATIONS

Extended European Search Report for Application No. 06712000.6-2205/1840632 dated Jan. 7, 2009 with English translation.

International Search Report for International Application No. PCT/JP2006/300754 dated May 16, 2006.

R.J. Simes, et al.; "Electrically tunable Fabry-Perot mirror using multiple quantum well index modulation"; Applied Physics Letters, Aug. 22, 1988, vol. 53, No. 8, pp. 637 to 639.

Office Action for Chinese Patent application No. 200810215198.X with English translation dated Mar. 10, 2010.

Chinese Office Action for Chinese Application No. 200810215199.4 issued May 12, 2010 with English translation.

Notification of Reason(s) for Refusal for Japanese Patent Application No. 2005-031911 dispatched Dec. 21, 2010 with English translation.

Notification of Reason(s) for Refusal for Japanese Patent Application No. 2005-012980 dispatched Dec. 21, 2010 with English translation.

Notification of Reason(s) for Refusal for Japanese Patent Application No. 2005-053390 dispatched Dec. 21, 2010 with English translation.

Notification of Reason(s) for Refusal for Japanese Patent Application No. 2005-073306 dispatched Dec. 21, 2010 with English translation.

\* cited by examiner

LIGHT CONTROL APPARATUS HAVING LIGHT MODULATING FILM

BACKGROUND OF THE INVENTION

1. Field of the Invention

This invention relates to a light control apparatus.

2. Description of the Related Art

In recent years, a digital information recording system using the principle of hologram has been known as a large-capacity recording method (Patent Document 1, for instance).

FIG. 5 illustrates an example of a hologram recording apparatus. A hologram recording apparatus 100 principally includes a laser light source 102, a beam splitter 104, a beam expander 106, a spatial light modulator SLM 108, a hologram pattern writing means 110, a Fourier transform lens 112, a recording medium 114, a mirror 116 and a rotating mirror 118. Here, a transmissive display apparatus is used as a spatial light modulator SLM 108.

In the hologram recording apparatus 100, laser light emitted from the laser light source 102 is split into two beams of light by the beam splitter 104. One of the beams of light undergoes an enlargement of beam diameter by the beam expander 106 and is irradiated to the spatial light modulator SLM 108 as parallel light. The hologram pattern writing means 110 transmits a hologram pattern to the spatial light modulator SLM 108 as an electrical signal. The spatial light modulator SLM 108 forms a hologram pattern on a plane based on the electrical signal received. The light irradiated to the spatial light modulator SLM 108 is light-modulated by passing through the spatial light modulator SLM 108 and becomes a signal light containing a hologram pattern. This signal light is subjected to a Fourier transform as it passes through the Fourier transform lens 112 and is focused into the recording medium 114. On the other hand, the other of the beams of light, which has been split by the beam splitter 104, is led as reference light to the inside of the recording medium 114 through the mirror 116 and the rotating mirror 118. Inside the recording medium 114, the light paths of the signal light containing the hologram pattern and the reference light cross each other to form an optical interference pattern. The whole interference pattern is now recorded as a change in refractive index (refractive index grating) in the recording medium 114.

In a hologram recording apparatus 100, an image of one frame is recorded in this manner in a recording medium 114. Upon completion of the recording of the image of one frame, the image of a second frame is recorded using the same procedure, by turning the rotating mirror 118 by a predetermined amount and at the same time moving the position thereof parallely by a predefined amount, thereby changing the angle of incidence of reference light in relation to the recording medium 114. By repeating a processing like this, an angular-multiplexing recording is carried out.

The material that can be used for the spatial light modulator SLM of a hologram recording apparatus is, for instance, lead lanthanum zirconate titanate (hereinafter referred to as PLZT) or the like which has an electro-optical effect. PLZT is a transparent ceramic which has a composition of $(Pb_{1-y}La_y)(Zr_{1-x}Ti_x)O_3$. An electro-optical effect is a phenomenon in which an electric field applied to a substance causes polarization in the substance with a resulting change in its refractive index. Using the electro-optical effect, the phase of light can be switched by turning the applied voltage on and off. Accordingly, a light modulating material with an electro-optical effect can be applied to the optical shutter of a spatial light modulator SLM or the like.

In applications to these optical shutter and other devices, bulk PLZT has been widely used conventionally (Patent Document 2). However, it is difficult for the optical shutters using bulk PLZT to meet the demands for miniaturization or higher integration or the demands for lowered operating voltage or lowered cost. Besides, the bulk method involves a process of treating at high temperatures of 1000° C. or above after the mixing of material metal oxides, and hence, if applied to a device forming process, it may place many constraints on the selection of materials, the structure of the device and the like.

Under these circumstances, there have been attempts at applying a thin film of PLZT formed on a base material, instead of bulk PLZT, to light control devices. Described in Patent Document 3 is a display apparatus for which a PLZT film is formed on a glass or other transparent substrate and comb-shaped electrodes are placed thereon. This display apparatus has such a structure that a polarizing plate is provided on each of both faces of a display substrate with a PLZT film formed thereon. Here, the electrode terminal of each pixel is connected with an external drive circuit, so that desired pixels are driven and thus a desired display can be produced by transmission light from a light source provided on one face of the display substrate.

[Patent Document 1]
  Japanese Patent Application Laid-Open No. 2002-297008.
[Patent Document 2]
  Japanese Patent Application Laid-Open No. Hei05-257103.
[Patent Document 3]
  Japanese Patent Application Laid-Open No. Hei07-146657.

(First Problem to be Solved)

However, if a light modulating film such as a PLZT film or the like as described above is to be put to practical use as an optical shutter device or the like, it will be necessary to form a drive circuit for controlling the on and off of the voltage applied to the light modulating film, together with the light modulating film, on a substrate. In so doing, however, the structure as described in aforementioned Patent Document 3 has the problem that the area where the drive circuit is formed cannot be used as a display area and hence an effective display area cannot be secured sufficiently.

Also, when visible light is used as the irradiation light, a transmissive display apparatus as described above had the problem that the drive circuit cannot be formed on a silicon or like substrate which is opaque to visible light.

Moreover, with a display apparatus as described in Patent Document 3, which uses polarizing plates, a loss of light due to the polarizing plates occurs.

(Second Problem to be Solved)

A discussion will be made of a method for applying an electric field to a light control device using a thin-film PLZT as described in Patent Document 3. When an electrode using Au, $IrO_2$, Al, or the like as material is formed on the surface of PLZT, the electrode part does not allow the penetration of light, so that the opening ratio and light utilization efficiency will drop inevitably. Thereupon, the inventors have attempted an improvement in which the electrodes formed on PLZT are formed by the use of transparent electrodes in order to further improve the light utilization efficiency.

ITO (Indium Tin Oxide) is known as a representative material for a transparent electrode. The inventors have formed electrodes on a PLZT film using this ITO as the electrode material and measured the electrical characteristics thereof. FIG. 8 is a graph showing relations between applied electric field and polarization when an opaque electrode is formed using IrO₂ and when a transparent electrode is formed using ITO. For both the materials, sputtering was used to form the electrodes.

From FIG. 8, it is apparent that the amount of polarization in response to an application of the same electric field decreases markedly when the electrode is formed of ITO in comparison to when the electrode is formed of Ir/IrO$_2$.

Also, the relative permittivity was measured, and as a result it became clear that the relative permittivity, which was ∈=1270 when the electrode was formed of Ir/IrO$_2$, dropped to ∈=820 when the electrode was formed of ITO.

(Third Problem to be Solved)

The inventors have investigated a light modulating apparatus having a Fabry-Perot resonator structure, in which a PLZT film is used as the light modulating film as an example of applying a thin-film PLZT to a light control device and a reflection layer is provided on both sides of the light modulating film. This light modulating apparatus, which is provided with a light modulating film and two reflection layers provided in such a way as to hold the light modulating film in between, controls light by changing the refractive index by the electric field applied to the light modulating film and thereby shifting the resonance wavelength of the light modulating apparatus.

In Fabry-Perot resonator, the resonance wavelength $\lambda m$ is given by $$\lambda m = (2nt \cos \theta)/m \quad \text{(Equation 1)}$$

where m is a degree, n is a refractive index within the resonator, t is the length of the resonator, and θ is an incident angle of laser light within the resonator. Here, the film thickness of the light modulating film corresponds to the length t of the resonator.

Since the resonance wavelength $\lambda m$ is proportional to the resonator length t, variation in film thickness of the light modulating film results in variation in resonance wavelength. That is, an extremely high accuracy is required of the film thickness t of a light modulating film if the reproducibility of the resonance wavelength $\lambda m$ is to be achieved.

Here, when an electric field is applied in the thickness direction of light modulating film, it is necessary to make the film thickness as thin as about 1 μm because of its relationship with voltage if a sufficient electric field is to be obtained. However, it is difficult to form the film thickness of a PLZT film, which is so thin, with a high accuracy of about 1%.

SUMMARY OF THE INVENTION

An aspect of the present invention has been achieved in view of these circumstances, and an object thereof is to provide a reflection-type light control apparatus featuring an improved light utilization efficiency.

Another aspect of the present invention has been achieved in view of these circumstances, and an object thereof is to provide a light control apparatus which is not subject to any degradation of electrical characteristics even when transparent electrodes are used as the electrode material.

Other aspects of the present invention have been achieved in view of these circumstances, and an object thereof is to provide a light modulating apparatus that can offer stable resonance wavelength irrespective of variation in resonator length.

First Group Of Embodiments

An embodiment of the present invention to solve the above first problem to be solved relates to a light control apparatus.

This light control apparatus comprises: a substrate; a first reflection layer provided on the substrate; a light modulating film, provided on the first reflection layer, whose refractive index is controlled by an electric field applied thereto; a second reflection layer provided on the light modulating film; and a pair of electrodes which applies the electric field to the light modulating film.

Holding the light modulating film in between the first and the second reflection layer constitutes a resonator in which the light having entered from the outside undergoes the multiple reflection in between the two reflection layers. Varying the voltage applied to a pair of electrodes changes the refractive index of the light modulating film and controls the resonance wavelength of this resonator. As a result, the amount of light having entered from the above of the light control apparatus reflects can be controlled.

The light control apparatus may further comprise a transparent electrode provided between the light modulating film and the second reflection layer, wherein the transparent electrode and the first reflection layer may form a pair of electrodes.

The "transparent electrode" does not mean the one which is visibly transparent, but means that it has a sufficient transmittance relative to the wavelength of light entering the light control apparatus.

The first reflection layer is formed of a metallic material so as to form an upper electrode and a transparent electrode is used as a lower electrode. Also, the electrodes are so formed as to sandwich the light modulating film therebetween. As a result, the electric field can be applied in the thickness direction of the light modulating film. The use of the transparent electrode in an upper electrode existing on a light path of light entering the light control apparatus can improve the opening ratio and reduce the loss of light due to diffraction.

The second reflection layer has a laminated structure including a plurality of dielectric films whose refractive indices differ.

Forming an upper-surface reflection layer by a dielectric multilayer film can control the reflectance with high accuracy by the number of layers to be laminated and the material of dielectric film.

At least one of the plurality of dielectric films may be a silicon dioxide film.

At least one of the plurality of dielectric films may be a silicon nitride film.

If they are to be formed of silicon dioxide films or silicon nitride films, it will be possible to use exactly the same film formation techniques for the normal silicon semiconductor manufacturing process. Also, if formed of silicon nitride films, they can function also as passivation film.

The reflectance of the first reflection layer may be approximately the same as that of the second reflection layer.

When the reflectance of the first reflection layer is the same as that of the second reflection layer, the amount of light which reflects, at the time when the light having the resonance wavelength of a light control apparatus enters the light control apparatus, becomes minimum. Hence, a light control apparatus having a high on-off ratio can be achieved. That the reflectance is approximately the same means that the error in the both sides is within 30% wherein the reflectance of the lower one serves as a benchmark.

The light modulating film may be made of electro-optical material whose refractive index changes in proportion to the square of the electric field applied.

The electro-optical material may be lead zirconate titanate PZT (Pb(Zr$_{1-x}$Ti$_x$)O$_3$) or lead lanthanum zirconate titanate. PLZT ((Pb$_{1-y}$La$_y$)(Zr$_{1-x}$Ti$_x$)O$_3$).

PZT or PLZT is a ferroelectric substance, and the rate of polarity change thereof is proportional to an exponential function of an electric field applied thereto. Accordingly, the on and off of light can be made faster. Also, the increase of electric field required for the on and off of light can be made smaller. Also, since the anisotropy of PLZT crystal is small, the difference in switching rate for each crystal grain. As a result, the variation in rate at the time of switching can be reduced.

The thickness of PLZT may be in a range of 500 nm to 1500 nm. If the red light in the vicinity of 650 nm is selected as the wavelength of light used for the light control apparatus, the light control can be performed efficiently because the film thickness is set to this range.

The pair of electrodes may be arranged in plurality in a matrix. Arrangement of a pair of electrodes in matrix can constitute a spatial light modulator.

Second Group of Embodiments

An embodiment of the present invention to solve the above second problem to be solved relates to a light control apparatus. This light control apparatus comprises: a substrate; a first reflection layer provided on the substrate; a light modulating film, provided on the first reflection layer, whose refractive index is controlled by an electric field applied thereto; a protective layer provided on the light modulating film; and a transparent electrode, provided on the protective layer, which applies the electric field to the light modulating film.

According to this embodiment, the formation of a protective layer in between the light modulating film and the transparent electrode can prevent the electric characteristics of the light modulating film from degrading, and can structure a light control apparatus having excellent electric characteristics.

The protective film may be made of iridium oxide $IrO_2$. The iridium oxide has the conductivity and therefore can protect suitably the light modulating film without affecting the electric field applied to the light modulating film through the transparent electrode.

The thickness of the protective layer may be in a range of 1 nm to 50 nm. When the protective film is made of iridium oxide, a significant effect was recognized as characteristics of the light control apparatus in a range of 1 nm to 50 nm, and more preferably in a range of 3 nm to 25 nm so as to obtain further significant effect. he protective layer is made of strontium ruthenium oxide.

The protective layer may be made of strontium ruthenium oxide $SrRuO_3$ or may be made of lanthanum strontium cobalt oxide $La_{0.5}Sr_{0.5}CoO_3$.

Even if such conductive oxides as these are used in place of iridium oxide, they suitably function as protective films.

The transparent electrode may be made of indium tin oxide (ITO). Also, the transparent electrode may be made of zinc oxide (ZnO).

The light modulating film may be made of lead zirconate titanate PZT $(Pb(Zr_{1-x}Ti_x)O_3)$ or lead lanthanum zirconate titanate PLZT $((Pb_{1-y}La_y)(Zr_{1-x}Ti_x)O_3)$.

The light control apparatus may further comprise a second reflection layer provided on the transparent electrode.

The transparent electrode and the first reflection layer may form a pair of electrodes. In such a case, the electric field is applied in the thickness direction of the light modulating film, so that the electric field occurring within the light modulating film can be made uniform.

The second reflection layer may have a laminated structure including dielectric films with different refractive indices. By forming the second reflection layer by a dielectric multilayer film, the reflectance can be suitably controlled by selecting the material, the number of layers and the thickness of the multilayer film. The reflectance of the first reflection layer may be approximately the same as that of the second reflection layer.

Another embodiment of the present invention relates to a structure. This structure comprises: a light modulating film formed by use of electro-optical material; a protective layer provided on the light modulating film; and a transparent electrode, provided on the protective layer, which applies an electric field to the light modulating film. This structure is provided in a light control apparatus which applies an electric field to the light modulating film and modulates light utilizing a change in refractive index thereof.

According to this embodiment, the electric field is applied through the protective layer. Thus, the deterioration in electric characteristics of the light modulating film can be prevented at the time when the transparent electrode is formed.

As the material for the protective layer of the above-described, it may be made of iridium oxide, strontium ruthenium oxide, lanthanum strontium cobalt oxide or the like.

The transparent electrode of the above structure may be made of indium tin oxide or zinc oxide.

The light modulating film of the above structure may be made of lead zirconate titanate or lead lanthanum zirconate titanate.

Third Group of Embodiments

A light modulating system according to an embodiment of the present invention to solve the above third problem to be solved comprises: a Fabry-Perot resonator whose cavity length is fixed; a laser light source which irradiates the Fabry-Perot resonator with laser light; and an adjusting means which adjusts an incident angle of the laser light to the Fabry-Perot resonator.

According to this embodiment, the light path length of laser light within a Fabry-Perot resonator is varied by varying the incident angle of laser light, so that the resonance wavelength can be adjusted in a simplified and easy manner.

The Fabry-Perot resonator may be a light control apparatus in which a light modulating film, whose refractive index changes according to an electric field applied thereto, is interposed by reflection layers.

In the light control apparatus including the light modulating film and the two-layer reflection layers, when the film thickness of the light modulating film varies, the resonance wavelength also varies along with it. However, the resonance wavelength can be adjusted to a desired value by adjusting the incident angle of laser light.

The Fabry-Perot resonator is placed on a movable mounter, and the adjusting means may adjust a setting direction of the Fabry-Perot resonator by tilting the movable mounter.

The laser light source is placed on a second mounter, and the adjusting means may adjust an optical axis of the laser light source by tilting the second mounter.

The system may further comprise an optical element which corrects a beam pattern of the laser light wherein the optical element is arranged on a light path of laser light reflected from the Fabry-Perot resonator. This optical element may be a prism. If the problem of an image distortion, caused by varying the incident angle of laser light to the Fabry-Perot resonator, arises, the beam pattern can be corrected by the provision of an optical element.

The light control apparatus may comprise: a substrate; a first reflection layer provided on the substrate; a light modulating film, provided on the first reflection layer, whose refractive index is controlled by an electric field applied thereto; a second reflection layer provided on the light modulating film; and a pair of electrodes which applies the electric field to the light modulating film.

The light modulating film may be made of electro-optical material whose refractive index changes in proportion to the square of the electric field applied. The electro-optical material may be lead zirconate titanate or lead lanthanum zirconate titanate. The pair of electrodes may be arranged in plurality in a matrix.

Another embodiment of the present invention relates to a correction method. This correction method is a method for correcting a Fabry-Perot resonator in which a light modulating film whose refractive index changes according to an electric field applied thereto is interposed by reflection layers, and the method comprises: applying a predetermined voltage to the light modulating film; having laser light enter the Fabry-Perot resonator and measuring the intensity of laser light reflected from the Fabry-Perot resonator; adjusting an incident angle of laser light relative to the Fabry-Perot resonator so that the intensity of laser light measured in the measuring is brought close to a design value which is to be obtained when the predetermined voltage is applied.

The predetermined voltage may be a voltage such that the reflectance of the Fabry-Perot resonator becomes minimum in design. In a state where the reflectance of the Fabry-Perot resonator becomes minimum, the incident angle of laser light is adjusted so that the intensity of laser light measured in the measuring becomes minimum. Thereby, the resonance wavelength can be corrected with a high degree of accuracy.

Fourth Group of Embodiments

A light modulating apparatus according to an embodiment of the present invention to solve the third problem to be solved comprises: a resonator having a structure of Fabry-Perot resonator in which a light modulating film whose refractive index changes according to an electric field applied thereto is interposed by reflection layers; a control unit which modulates the light, having entered the resonator, by applying a control voltage to the resonator and outputs it; and a bias unit which applies to the resonator a bias voltage by which to adjust a resonance wavelength of the resonator.

According to this embodiment, the resonance wavelength of a resonator can be shifted by varying the bias voltage, so that the resonance wavelength can be adjusted.

The light modulating apparatus may be provided with a plurality of sets of at least resonators and control units. A spatial light modulating apparatus may be structured by arranging resonators in a matrix.

The light modulating film may be made of electro-optical material whose refractive index changes in proportion to the square of the electric field applied. The electro-optical material may be lead zirconate titanate or lead lanthanum zirconate titanate.

The light modulating film may be made of electro-optical material whose refractive index changes in proportion to the electric field applied and the bias unit may generate a positive or negative bias voltage. The electro-optical material may be any of lithium niobate, lithium tantalate and strontium barium niobate.

The resonator may comprise: a substrate; a first reflection layer provided on the substrate; a light modulating film, provided on the first reflection layer, whose refractive index is controlled by an electric field applied thereto; a second reflection layer provided on the light modulating film; and a pair of electrodes which applies the electric field to the light modulating film.

The light modulating apparatus may further comprise an adjustment circuit which adjusts the bias voltage generated by the bias unit. In this case, the resonance wavelength of a resonator can be adjusted to a suitable value by adjusting the bias voltage.

The light modulating apparatus may be integrated into a single chip as a semiconductor integrated circuit device. The light modulating apparatus may include a terminal by which to input a signal that instructs adjustment of the bias voltage. In such a case, the light modulating apparatus can be compact-sized, and a feedback control of bias voltage can be performed using a light detecting device.

Another embodiment of the present invention relates to a method for correcting a light modulating apparatus. This method is a method for correcting a light modulating apparatus which comprises: a resonator having a structure of Fabry-Perot resonator in which a light modulating film whose refractive index changes according to an electric field applied thereto is interposed by reflection layers; a control unit which modulates the light, having entered the resonator, by applying a control voltage to the resonator and outputs it; and a bias unit which applies to the resonator a bias voltage by which to adjust a resonance wavelength of the resonator. The method comprises: measuring the intensity of light output from the resonator, in a state where no voltage is applied to the resonator; and setting the bias voltage in response to this intensity of light.

According to this embodiment, even if the resonance wavelength of a resonator fluctuates, the resonance wavelength can be corrected with a high degree of precision.

Still another embodiment of the present invention relates to a light modulating system. This light modulating system comprises: a light modulating apparatus; a light emitting unit which irradiates light to said light modulating apparatus; and a light receiving unit which receives light which has exited from said light modulating apparatus. According to this embodiment, a hologram recording apparatus and a display apparatus, for example, can be realized.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

A light control apparatus according to a first embodiment will be described in outline. This light control apparatus is used, for instance, as a spatial light modulator SLM in a hologram recording/reproducing apparatus.

Figure 1:
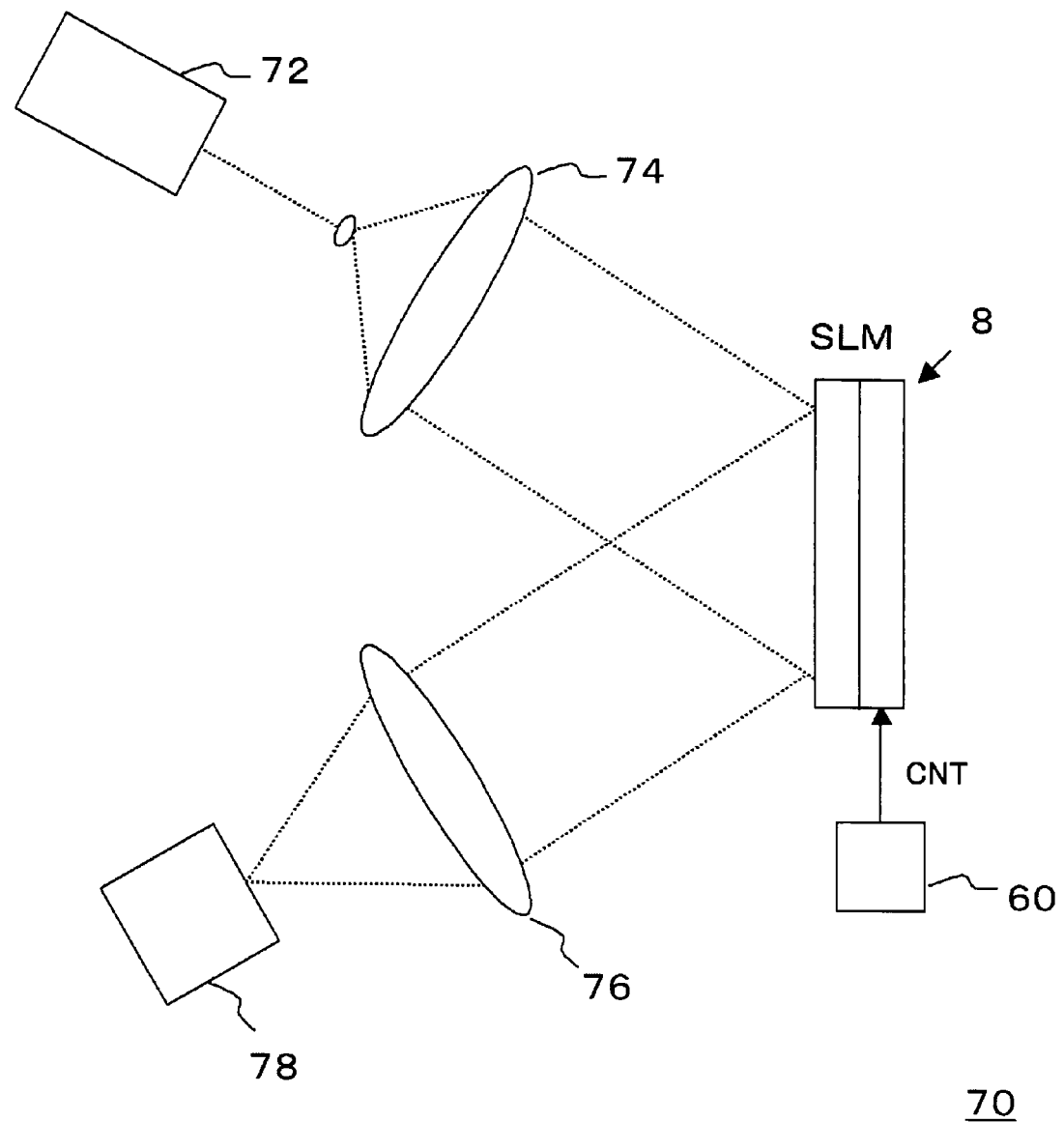
FIG. 1 is an illustration showing a hologram recording apparatus wherein a light control apparatus according to an embodiment is used as a spatial light modulator SLM.

FIG. 1 is an illustration showing a hologram recording apparatus wherein a light control apparatus according to the present embodiment is used as a spatial light modulator SLM. The hologram recording apparatus 70 includes a control unit 60, a laser light source 72, a beam expander 74, a Fourier transform lens 76, and a recording medium 78.

In the hologram recording apparatus 70, laser light emitted from the laser light source 72 is split into two beams of light by a beam splitter (not shown). One of the beams of light, which is used as reference light, is led into recording medium 78. The other of the beams of light undergoes an enlargement of beam diameter by the beam expander 74 and is irradiated to a spatial light modulator SLM (light control apparatus 8) as parallel light.

The light control apparatus 8 has pixels arranged in a matrix and is so configured that the reflectance of each pixel changes independently. The control unit 60 controls the reflectance of each pixel of the light control apparatus 8 by the use of a control signal CNT. The light irradiated to the spatial light modulator SLM is reflected from the spatial light modulator SLM as signal light which has different intensities for different pixels. This signal light is subjected to a Fourier transform as it passes through the Fourier transform lens 76 and is converged within the recording medium 78. Inside the recording medium 78, the light paths of the signal light containing a hologram pattern and the reference light cross each other to form an optical interference pattern. The whole interference pattern is now recorded as a change in refractive index (refractive index grating) in the recording medium 78.

Figure 2A:
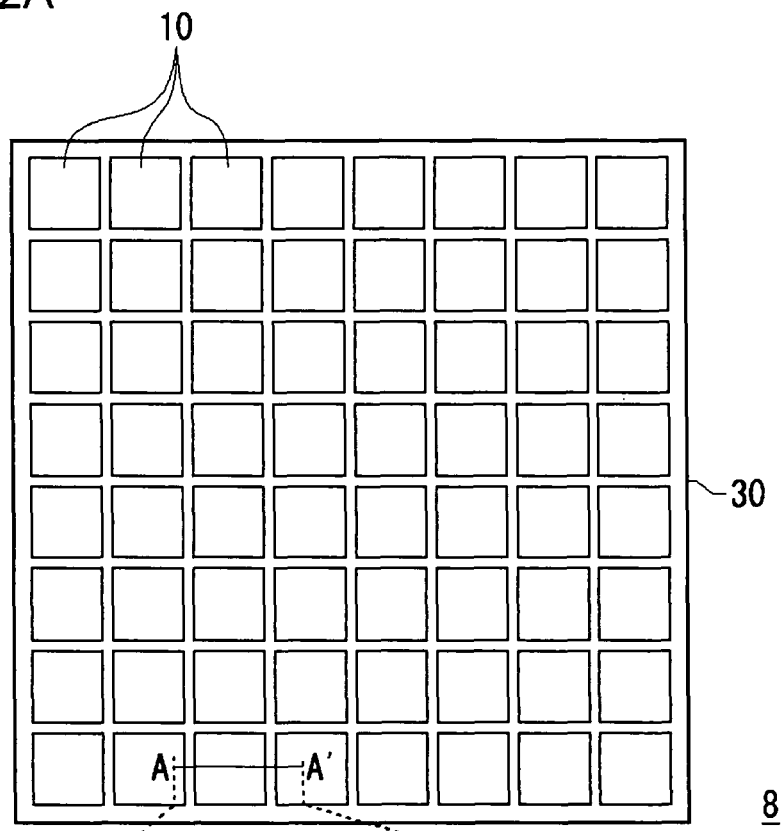
FIGS. 2A and 2B show a light control apparatus according to an embodiment.

FIG. 2A shows a plan view of a light control apparatus 8 according to the present embodiment. The light control apparatus 8 is provided with a plurality of pixels 10 which are arranged two-dimensionally in eight rows and eight columns on a substrate 30. Each pixel 10 is structured in a size of about 20 μm×20 μm. Inputted to each pixel 10 is a control signal CNT output from the control unit 60 of FIG. 1.

Figure 2B:
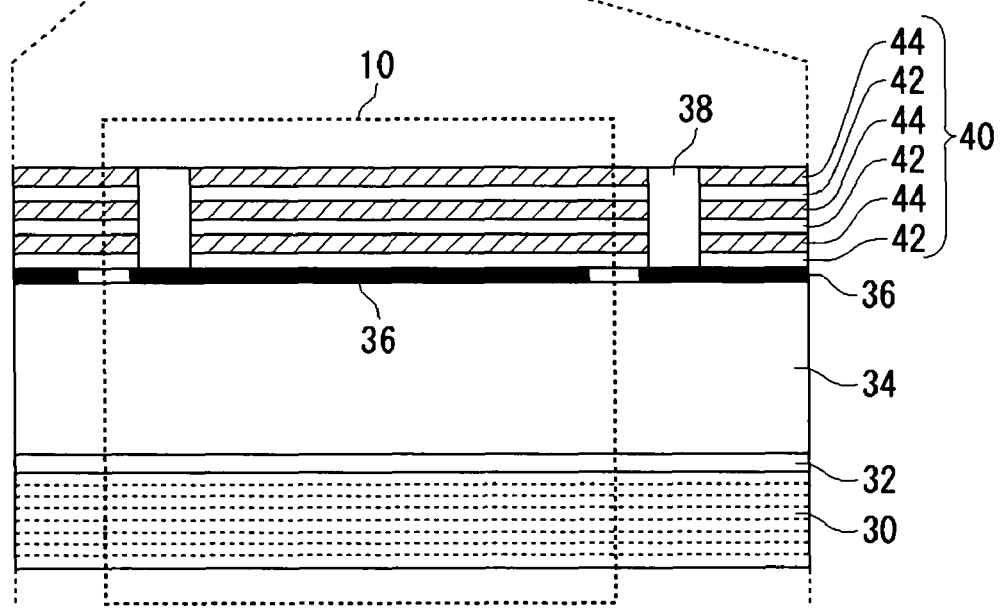

FIG. 2B shows an A-A' cross-sectional view of a light control apparatus shown in FIG. 2A. The light control apparatus 8 includes a substrate 30, a first reflection layer 32, a light modulating film 34, a transparent electrode 36, a wiring 38 and a second reflection layer 40.

The light control apparatus 8 according to the present embodiment is formed on the substrate 30. Glass, silicon, or the like with a flat surface may preferably be used as material for this substrate 30.

The first reflection layer 32 is formed on the substrate 30. A metallic material, such as Pt, may preferably be used as material for the first reflection layer 32. The thickness of the first reflection layer 32 is set to about 200 nm. According to the present embodiment, the first reflection layer 32 is formed of Pt, and this first reflection layer 32 functions as an electrode for applying an electric field to the light modulating film 34 as will be described later.

When the first reflection layer 32 is formed of Pt, the reflectance of the first reflection layer 32 is about 60% to 80%.

The light modulating film 34 is provided on the top surface of the first reflection layer 32. To be selected as the material for this light modulating film 34 is a solid electro-optical material whose refractive index changes with the electric field applied. Although such electro-optical materials that can be used include PLZT, PZT, $LiNbO_3$, GaA-MQW, SBN((Sr,Ba)$Nb_2O_6$) and the like, PLZT, in particular, is preferably used. The thickness t of the light modulating film 34, which is determined according to the incident angle and wavelength of entering light, should preferably be formed in a range of 500 nm to 1500 nm when the incident light is, for instance, a red light near 650 nm. As will be described later, an electric field applied to the light modulating film 34 is applied in the thickness direction thereof, so that if the film thickness is 1500 nm or more, it will be difficult to apply an electric field that can produce a sufficient change in refractive index. Also, if the film thickness is 500 nm or less, then it will not be possible to obtain a sufficient optical film thickness change Δnt.

The transparent electrode 36 is provided on the top surface of the light modulating film 34. The transparent electrode 36 may, for instance, be formed of ITO (Indium Tin Oxide), ZnO, $IrO_2$, or the like. When the transparent electrode 36 is formed of ITO or ZnO, the thickness thereof shall be about 100 nm to 150 nm. When it is formed of $IrO_2$, the film thickness is preferably thinner, that is, about 50 nm, for instance. This transparent electrode 36 has a trade-off relationship between resistance and transmittance, so that the thickness thereof may be determined experimentally.

This transparent electrode 36 is formed in such a manner as to be arranged in a matrix for all pixels 10 respectively.

The second reflection layer 40 is formed on the top surface of the transparent electrode 36. This second reflection layer 40 is comprised of a dielectric multilayer film, which is a stack of alternating first dielectric film 42 and second dielectric film 44 having different refractive indices. A combination of materials that can be used for the first dielectric film 42 and second dielectric film 44 may be $SiO_2$ (n=1.48) and $Si_3N_4$ (n=2.0).

If the dielectric multilayer film is to be formed of silicon dioxide films and silicon nitride films, it will be possible to use exactly the same manufacturing process and manufacturing equipment of silicon semiconductor integrated circuits.

The dielectric multilayer film can be formed by a plasma CVD (Chemical Vapor Deposition) method. The $SiO_2$ film can be grown in an ambience of TEOS and $O_2$ at the temperature of 200° C. and the $Si_3N_4$ film may be grown suitably in an ambience of $SiH_4$ and $NH_3$ at the temperature of 200° C.

The dielectric multilayer film can also be formed by an ion beam sputtering method.

The thicknesses t1 and t2 respectively of the first dielectric film 42 and second dielectric film 44 are so designed as to be ¼ of the wavelength of light entering the light control apparatus 8. That is, if the wavelength of light entering the light control apparatus 8 is λ and the refractive index of the dielectric film is n, the thickness t for each layer of the dielectric films is so adjusted as to be t=λ/(n×4).

For example, suppose that a red laser light of wavelength λ=633 nm is used for a light control apparatus 8, then the thickness t1 of the first dielectric film 42 will approximately be t1=633/(4×1.48)=106 nm if the material used is $SiO_2$ (n=1.48). Likewise, the thickness t2 of the second dielectric film 44 will approximately be t2=633/(4×2)=79 nm if the material used is $Si_3N_4$ (n=2.0). It is not always necessary that the thicknesses t1 and t2 of the dielectric films constituting the second reflection layer 40 be designed to be exactly λ/4.

As material for the dielectric film, $TiO_3$ (n=2.2) may be used instead of silicon nitride film. In this case, the thickness t2 of the second dielectric film 44 is set approximately to t2=633/(4×2.2)=72 nm.

In FIG. 2B, the reflectance R2 of light entering a second reflection layer 40 from a light modulating film 34 is so designed as to be equal to the reflectance R1 of light entering a first reflection layer 32 from the light modulating film 34. The reflectance R1 is determined by the metallic material used for the first reflection layer 32, and is 60 to 80% when Pt is selected.

At this time, therefore, the reflectance R2 is also designed to be 60 to 80%. The reflectance R2 of the second reflection layer 40 can be adjusted by the materials and thicknesses of the first dielectric films 42 and the second dielectric films 44. According to the present embodiment, the second reflection layer 40, as shown in FIG. 2, is a stack of alternating three layers each of the first dielectric films 42 and the second dielectric films 44. In the second reflection layer 40, the stacking order of the first dielectric films 42 and the second dielectric films 44 may be reversed. Also, a third dielectric film may be further stacked in order to fine-adjust the reflectance R2.

The second reflection layer 40 has openings, and the transparent electrode 36 is led to the outside through vias and wiring 38. As material for the wiring 38, Al or the like is used preferably.

On the top surface of the wiring 38, a protective film may further be formed.

In the present embodiment, a transparent electrode 36 and a first reflection layer 32 form a pair of electrodes. The potential of the first reflection layer 32 is, for instance, fixed to ground potential, whereas the potential of the transparent electrode 36 of each pixel is controlled by the control signal CNT.

A description will be given of an operation of a light control apparatus 8 configured as described above.

Figure 3:
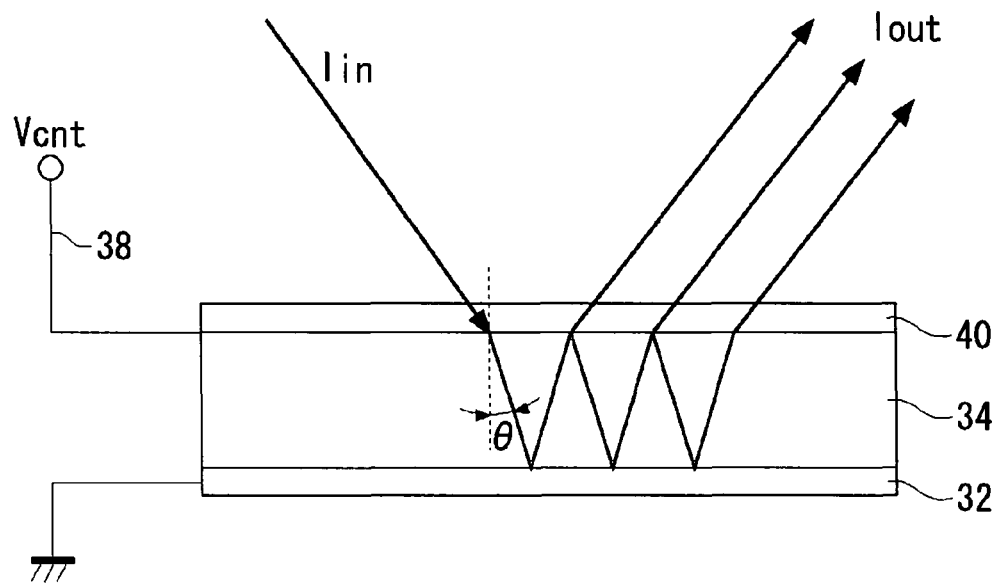
FIG. 3 illustrates schematically a state of operation of one pixel of a light control apparatus shown in FIG. 2.

FIG. 3 illustrates schematically a state of operation of one pixel of the light control apparatus 8. In the figure, the same components as those in FIG. 2 are denoted by the same reference numerals. Also, for simplicity, components, such as a transparent electrode 36, are omitted.

From above the light control apparatus 8, laser light of intensity Iin is introduced. A first reflection layer 32, a light modulating film 34 and a second reflection layer 40 of the light control apparatus 8 constitute a Fabry-Perot resonator, and part of the incident light is entrapped therewithin and part thereof is reflected. If the intensity of incident laser light is Iin and the intensity of laser light reflected by the light control apparatus 8 is Iout, the reflectance R of the light control apparatus 8 will be defined as R=Iout/Iin.

Figure 4:
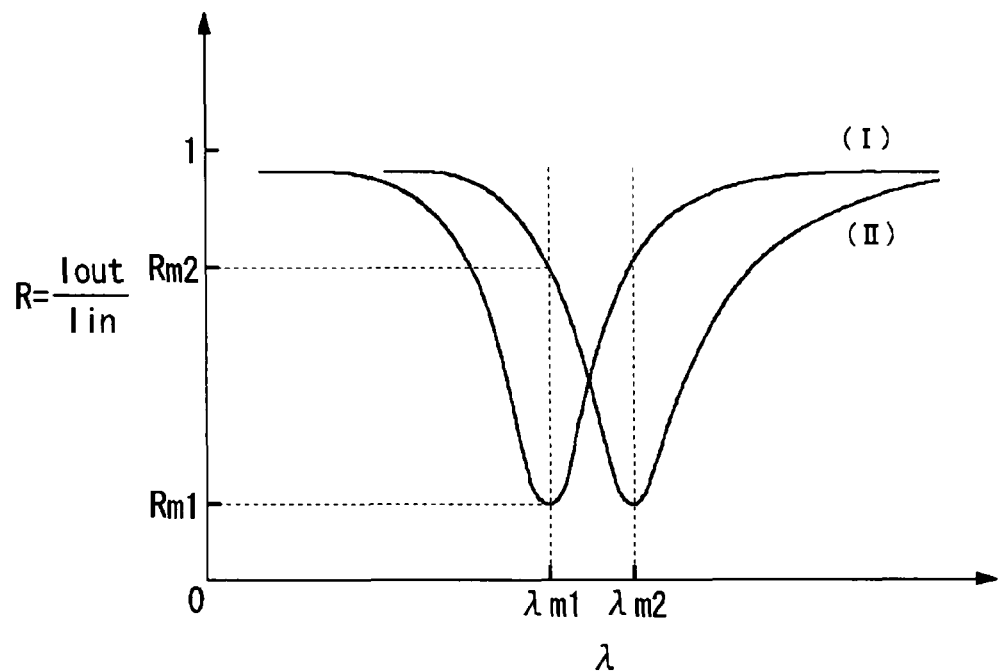
FIG. 4 shows a relationship between a wavelength $\lambda$ of light incident on a light control apparatus and a reflectance R.
Figure 5:
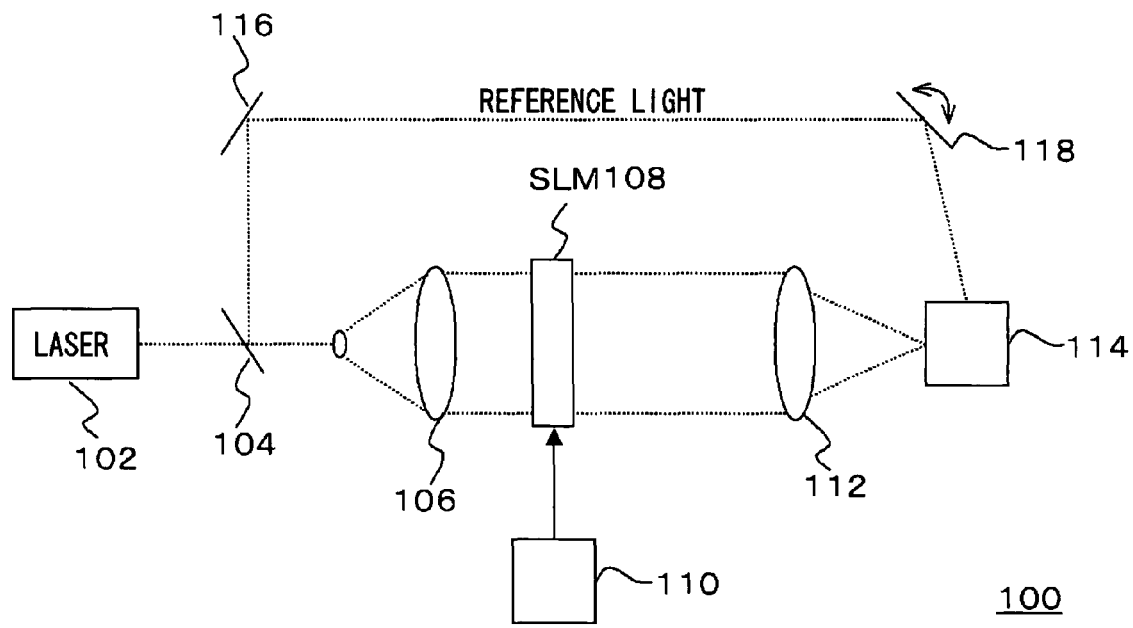
FIG. 5 illustrates an example of a hologram recording apparatus.

FIG. 4 shows a relationship between the wavelength λ of light incident on a light control apparatus 8 and the reflectance R thereof.

The Fabry-Perot resonator constituted by a first reflection layer 32, a light modulating film 34 and a second reflection layer 40 has a resonance wavelength of λm=2 nt cos θ/m, where m is a degree, n is the refractive index of the light modulating film 34, t is the thickness of the light modulating film 34, and θ is the incident angle of laser light. As shown in FIG. 4, the reflectance R of the light control apparatus 8 takes the minimum value at the resonance wavelength λm.

As described above, the refractive index n of the light modulating film 34 is dependent on the electric field applied to the pair of electrodes. Now, if the first reflection layer 32 is at ground potential and a control voltage Vcnt is applied to the not-shown transparent electrode 36, an electric field E=Vcnt/t will be applied to the light modulating film 34 in the thickness direction. Between the variation Δn in the refractive index n of the light modulating film 34 and the applied electric field E, there exists a relationship $\Delta n = \frac{1}{2} \times n^3 \times R \times E^2$, where R is an electro-optical constant (Kerr constant).

(I) in FIG. 4 represents reflection characteristics when the control voltage Vcnt is not applied.

Now, if a voltage V1 as the control voltage Vcnt is applied to the transparent electrode 36 of each pixel 10, the refractive index of the light modulating film 34 will change and the resonance wavelength of the resonator will shift from λm1 to λm2. The reflection characteristics at this time is represented by (II) in FIG. 4.

If the wavelength of laser light incident on the light control apparatus 8 is λm1, then changing the control voltage Vcnt from ground potential to a voltage V1 will cause a shift of the resonance wavelength and consequently a change of the reflectance of the light control apparatus 8 from Rm1 to Rm2.

Here, the ratio of the reflectance Ron when no voltage is applied to the reflectance Roff when a voltage is applied is defined as an on-off ratio. When the intensity Iin of incident light is constant, the intensity Iout of reflected light is proportional to the reflectance. Accordingly, a larger on-off ratio means a better accuracy with which the intensity Iout of reflected light can be controlled.

The closer the reflectance R1 at the first reflection layer 32 and the reflectance R2 at the second reflection layer 40 are to each other, the lower the reflectance R of the light control apparatus 8 at resonance wavelength km will be. Hence, by designing the reflectance R1 at the first reflection layer 32 and the reflectance R2 at the second reflection layer 40 to be equal to each other by adjusting the number of layers and materials of the dielectric multilayer film of the second reflection layer 40 as described earlier, the reflectance R1 at "off" time can be set low and the on-off ratio can be set high.

In this manner, in the light control apparatus 8 according to the present embodiment, an optical switching device that controls the intensity of reflected light Iout by changing the reflectance can be realized by changing the electric field to be applied to the light modulating film 34. Since the phase of reflected light can also be controlled by changing the refractive index of the light modulating film 34, the device can be used suitably for a hologram recording apparatus or the like.

This light control apparatus 8 being of a reflection-type structure, it is not necessary to have the incident light Iin transmitted through the substrate 30. Consequently, this light control apparatus 8 can have an improved light utilization efficiency, compared with the conventional transmissive-type light control apparatus.

In the light control apparatus 8 according to the present embodiment, a plurality of pixels 10 are arranged in a matrix, with each of the pixels 10 having a pair of electrodes, so that the reflectance can be controlled independently for each pixel and thus it can be used as a spatial light modulator SLM.

In the light control apparatus 8 according to the present embodiment, a pair of electrodes is formed by a first reflection layer 32 and a transparent electrode 36, so that an electric field can be applied uniformly in the thickness direction of the light modulating film 34 and thus the refractive index within the light modulating film 34 can be changed uniformly.

Further, in the light control apparatus 8 according to the present embodiment, a reflection-type modulator is structured, so that an opaque material can be used as the substrate 30. For example, when silicon is used as the substrate 30, transistor devices and the like can be formed within the silicon and thus an active matrix drive, in which control means for control voltage Vcnt are provided for individual pixels, can be accomplished.

Light utilization efficiency improves because the use of a transparent electrode 36 as the upper electrode for applying an electric field to the light modulating film 34 can raise the opening ratio and minimize the diffraction. The improvement in light utilization efficiency means the possibility of lowering the intensity Iin of incident laser light, which makes it possible to reduce power consumption.

Further, in the light control apparatus 8 according to the present embodiment, the transparent electrode 36 is formed on top of the light modulating film 34, and the second reflection layer 40 is formed on top thereof. As a result, the distance between the upper electrode and the lower electrode can be made shorter than when a transparent electrode 36 is formed on top of the second reflection layer 40, so that the electric field E applied to the light modulating film 34 can be raised. From a different viewpoint, this means the possibility of lowering the voltage to be applied between the electrodes to apply the same electric field, which makes it possible to operate the light control apparatus 8 at low voltage.

In the light control apparatus 8 according to the present embodiment, the intensity Iout of reflected light is changed by controlling the reflectance R, so that it does not need a deflection plate or an analyzer and has an advantage of high light utilization efficiency.

Thus far, the first embodiment has been described. This embodiment is merely exemplary and it is understood by those skilled in the art that various modifications are possible and those modifications are also within the scope of the present invention.

According to this embodiment, a description has been given of a case where a pair of electrodes is formed by a transparent electrode 36 as the upper electrode and a first reflection layer 32 as the lower electrode, but this should not be considered as limiting. For example, the electrode pair that applies an electric field to the light modulating film 34 may be formed as a comb-shaped electrode on top of the light modulating film 34. At this time, an electric field is applied in the horizontal direction relative to the light modulating film 34. In this case, too, it is desirable that the comb-shaped electrode be a transparent electrode formed of ITO or the like.

According to this embodiment, a second reflection layer 40 is formed on top of a transparent electrode 36, but this may be reversed. In such a case, a transparent electrode 36 is formed on top of a second reflection layer 40, so that the second reflection layer 40 can be more flattened.

The second reflection layer 40 may be a half mirror formed of a metal thin film. In such a case, the manufacturing process can be more simplified than when a dielectric multilayer film is formed.

In this embodiment, a description has been given of a case where a light control apparatus 8 is used as the spatial light modulator of a hologram recording apparatus 70, but this should not be considered as limiting. It may be used in display apparatuses, optical communication switches, optical communication modulators, optical arithmetic units, encryption circuits, etc.

In this embodiment, a description has been given of a case where an electro-optical material is used as the light modulating film 34 and an electrode pair for applying an electric field to the light modulating film 34 is provided. The present invention, however, may use a magneto-optical material as the light modulating film 34, and in such a case, the electrode pair for applying an electric field may be replaced by a magnetic field applying means for applying a magnetic field.

Second Embodiment

A light control apparatus according to a second embodiment of the present invention will be described in outline. This light control apparatus is used, for instance, as a spatial light modulator in a hologram recording/reproducing apparatus.

FIG. 1 is an illustration showing a hologram recording apparatus wherein a light control apparatus according to the present embodiment is used as a spatial light modulator. The hologram recording apparatus 70 includes a spatial modulator SLM (light control apparatus 8), a control unit 60, a laser light source 72, a beam expander 74, a Fourier transform lens 76, and a recording medium 78.

In the hologram recording apparatus 70, laser light emitted from the laser light source 72 is split into two beams of light by a beam splitter (not shown). One of the beams of light, which is used as reference light, is led into recording medium 78. The other of the beams of light undergoes an enlargement of beam diameter by the beam expander 74 and is irradiated to a spatial light modulator SLM (light control apparatus 8) as parallel light.

The light control apparatus 8 has pixels arranged in a matrix and is so configured that the reflectance of each pixel changes independently. The control unit 60 controls the reflectance of each pixel of the light control apparatus 8 by use of control signal CNT. The light irradiated to the spatial light modulator SLM is reflected from the spatial light modulator SLM as signal light which has different intensities for different pixels. This signal light is subjected to a Fourier transform as it passes through the Fourier transform lens 76 and is focused into the recording medium 78. Inside the recording medium 78, the light paths of the signal light containing a hologram pattern and the reference light cross each other to form an optical interference pattern. The whole interference pattern is now recorded as a change in refractive index (refractive index grating) in the recording medium 78.

FIG. 2A shows a plan view of a light control apparatus 8 according to the present embodiment. The light control apparatus 8 is provided with a plurality of pixels 10 which are arranged two-dimensionally in eight rows and eight columns on a substrate 30. Each pixel 10 is structured in a size of about 20 μm×20 μm. Inputted to each pixel 10 is a control signal CNT output from the control unit 60 of FIG. 1.

FIG. 2B shows an A-A' cross-sectional view of a light control apparatus shown in FIG. 2A. The light control apparatus 8 includes a substrate 30, a first reflection layer 32, a light modulating film 34, a protective layer 50, a transparent electrode 36, a wiring 38, and a second reflection layer 40.

The light control apparatus 8 according to the present embodiment is formed on the substrate 30. Glass, silicon, or the like with a flat surface may preferably be used as material for this substrate 30.

The first reflection layer 32 is formed on the substrate 30. A metallic material, such as Pt, may preferably be used as material for the first reflection layer 32. The thickness of the first reflection layer 32 should be about 200 nm. According to the present embodiment, the first reflection layer 32 is formed of Pt, and this first reflection layer 32 functions as an electrode for applying an electric field to the light modulating film 34 as will be described later.

When the first reflection layer 32 is formed of Pt, the reflectance of the first reflection layer 32 is about 60% to 80%.

The light modulating film 34 is provided on the top surface of the first reflection layer 32. To be selected as the material for this light modulating film 34 is a solid electro-optical material whose refractive index changes with the electric field applied. Although such electro-optical materials that can be used include PLZT, PZT, $LiNbO_3$, GaA-MQW, SBN((Sr,Ba)$Nb_2O_6$), and the like, PLZT, in particular, is preferably used. The thickness t of the light modulating film 34, which is determined according to the incident angle and wavelength of entering light, should preferably be formed in a range of 500 nm to 1500 nm when the entering light is, for instance, a red light near 650 nm. As will be described later, an electric field applied to the light modulating film 34 is applied in the thickness direction thereof, so that if the film thickness is 1500 nm or more, it will be difficult to apply an electric field that can produce a sufficient change in refractive index. Also, if the film thickness is 500 nm or less, then it will be difficult to obtain a sufficient optical film thickness change $\Delta nt$.

In the light control apparatus 8 according to the present embodiment, a protective layer 50 is formed on top of the light modulating film 34. This protective layer 50 plays a role of preventing the aggravation of electrical characteristics of the light modulating film 34 by the transparent electrode 36 formed thereon.

As material for the protective layer 50, a conductive oxide film, such as iridium oxide $IrO_2$, strontium ruthenium oxide $SrRuO_3$, or lanthanum strontium cobalt oxide $La_{0.5}Sr_{0.5}CoO_3$, can be used suitably. In the present embodiment, a description will be given of a case where iridium oxide $IrO_2$ is used.

The protective layer 50 can be formed by sputtering. In an oxygen atmosphere, a substrate 30 with a PLZT film formed thereon and a target of iridium Ir are placed, and argon ions are irradiated to the target of iridium Ir. As a result, the sputtered iridium, as it combines with oxygen, gets deposited on the PLZT as iridium oxide $IrO_2$.

The film thickness tp of the protective layer 50, which will be described later, is preferably in a range of 1 nm to 50 nm, and more preferably in a range of 3 nm to 25 nm.

A transparent electrode 36 is formed on the top of the protective layer 50 formed on the light modulating film 34. The transparent electrode 36 may, for instance, be formed of ITO (Indium Tin Oxide), ZnO, or the like. When the transparent electrode 36 is formed of ITO or ZnO, the thickness thereof should be about 100 nm to 150 nm. This transparent electrode 36 has a trade-off relationship between resistance and transmittance, so that the thickness thereof may be determined experimentally.

The transparent electrode 36 may be formed by sputtering in the same way as for the protective layer 50. This transparent electrode 36 is formed in such a manner as to be arranged in a matrix for all pixels 10 respectively.

The second reflection layer 40 is formed on the top surface of the transparent electrode 36. This second reflection layer 40 is comprised of a dielectric multilayer film, which is a stack of alternating first dielectric film 42 and second dielectric film 44 having different refractive indices. A combination of materials that can be used for the first dielectric film 42 and second dielectric film 44 may be $SiO_2$ (n=1.48) and $Si_3N_4$ (n=2.0).

If the dielectric multilayer film is to be formed of silicon oxide films and silicon nitride films, it will be possible to use exactly the same manufacturing process and manufacturing equipment of silicon semiconductor integrated circuits.

The dielectric multilayer film may be formed by a plasma CVD (Chemical Vapor Deposition) method. The $SiO_2$ film may be grown in an atmosphere of TEOS and $O_2$ at the temperature of 200° C., and the $Si_3N_4$ film may be grown suitably in an atmosphere of $SiH_4$ and $NH_3$ at the temperature of 200° C.

The dielectric multilayer film may also be formed by an ion beam sputtering method.

The thicknesses t1 and t2 respectively of the first dielectric film 42 and second dielectric film 44 are so designed as to be ¼ of the wavelength of light entering the light control apparatus 8. That is, if the wavelength of light entering the light control apparatus 8 is $\lambda$ and the refractive index of the dielectric film is n, the thickness t for each layer of the dielectric films is so adjusted as to be $t=\lambda/(n\times 4)$.

For example, suppose that a red laser light of wavelength $\lambda$=633 nm is used for a light control apparatus 8, then the thickness t1 of the first dielectric film 42 will approximately be t1=633/(4×1.48)=106 nm where the material used is $SiO_2$ (n=1.48). Likewise, the thickness t2 of the second dielectric film 44 will approximately be t2=633/(4×2)=79 nm where the material used is $Si_3N_4$ (n=2.0). It is not always necessary that the thicknesses t1 and t2 of the dielectric films constituting the second reflection layer 40 be designed to be exactly $\lambda/4$.

As material for the dielectric film, $TiO_3$ (n=2.2) may be used instead of silicon nitride film. In this case, the thickness t2 of the second dielectric film 44 should approximately be t2=633/(4×2.2)=72 nm.

In FIG. 2B, the reflectance R2 of light entering a second reflection layer 40 from a light modulating film 34 is so designed as to be equal to the reflectance R1 of light entering a first reflection layer 32 from the light modulating film 34. The reflectance R1 is determined by the metallic material used for the first reflection layer 32, and is 50 to 80% when Pt is selected.

At this time, therefore, the reflectance R2 is also designed to be 50 to 80%. The reflectance R2 of the second reflection layer 40 can be adjusted by the materials and thicknesses of the first dielectric films 42 and the second dielectric films 44.

According to the present embodiment, the second reflection layer 40, as shown in FIG. 2, is a stack of alternating three layers each of the first dielectric films 42 and the second dielectric films 44. In the second reflection layer 40, the stacking order of the first dielectric films 42 and the second dielectric films 44 may be reversed. Also, a third dielectric film may be further stacked in order to fine-adjust the reflectance R2.

The second reflection layer 40 has openings, and the transparent electrode 36 is led to the outside through via holes and wiring 38. As material for the wiring 38, Al or the like is used preferably.

On the top surface of the wiring 38, a protective film may further be formed.

In the present embodiment, a transparent electrode 36 and a first reflection layer 32 form a pair of electrodes. The potential of the first reflection layer 32 is, for instance, fixed to ground potential, whereas the potential of the transparent electrode 36 of each pixel is controlled by the control signal CNT.

A description will be given of the operation of a light control apparatus 8 configured as described above.

FIG. 3 illustrates schematically an operation state of one pixel of the light control apparatus 8. In the figure, the same components as those in FIG. 2 are denoted by the same reference numerals. Also, for simplicity, components, such as a transparent electrode 36, are omitted.

From above the light control apparatus 8, laser light of intensity Iin is introduced. A first reflection layer 32, a light modulating film 34 and a second reflection layer 40 of the light control apparatus 8 constitute a Fabry-Perot resonator, and part of the incident light is entrapped therewithin and part thereof is reflected. If the intensity of incident laser light is Iin and the intensity of laser light reflected by the light control apparatus 8 is Iout, the reflectance R of the light control apparatus 8 will be defined as R=Iout/Iin.

FIG. 4 shows a relationship between the wavelength λ of light incident on a light control apparatus 8 and the reflectance R thereof.

The Fabry-Perot resonator constituted by a first reflection layer 32, a light modulating film 34 and a second reflection layer 40 has a resonance wavelength of $\lambda m=2\ nt\ \cos\theta/m$, where m is a degree, n is the refractive index of the light modulating film 34, t is the thickness of the light modulating film 34, and θ is the incident angle of laser light. As shown in FIG. 4, the reflectance R of the light control apparatus 8 takes the minimum value at the resonance wavelength λm.

As described above, the refractive index n of the light modulating film 34 is dependent on the electric field applied to the pair of electrodes. Now, if the first reflection layer 32 is at ground potential and a control voltage Vcnt is applied to the not-shown transparent electrode 36, an electric field E=Vcnt/t will be applied to the light modulating film 34 in the thickness direction. Between the variation Δn in the refractive index n of the light modulating film 34 and the applied electric field E, there exists a relationship $\Delta n = \frac{1}{2} \times n^3 \times R \times E^2$, where R is an electro-optical constant (Kerr constant).

(I) in FIG. 4 represents reflection characteristics when the control voltage Vcnt is not applied.

Now, if a voltage V1 as the control voltage Vcnt is applied to the transparent electrode 36 of each pixel 10, the refractive index of the light modulating film 34 will change and the resonance wavelength of the resonator will shift from λm1 to λm2. The reflection characteristics at this time is represented by (II) in FIG. 4.

If the wavelength of laser light incident on the light control apparatus 8 is λm1, then changing the control voltage Vcnt from ground potential to a voltage V1 will cause a shift of the resonance wavelength and consequently a change of the reflectance of the light control apparatus 8 from Rm1 to Rm2.

Here, the ratio of the reflectance Ron when no voltage is applied to the reflectance Roff when a voltage is applied is defined as an on-off ratio. When the intensity Iin of incident light is constant, the intensity Iout of reflected light is proportional to the reflectance. Accordingly, a larger on-off ratio means a better accuracy with which the intensity Iout of reflected light can be controlled.

The closer the reflectance R1 at the first reflection layer 32 and the reflectance R2 at the second reflection layer 40 are to each other, the lower the reflectance R of the light control apparatus 8 at resonance wavelength λm will be. Hence, by designing the reflectance R1 at the first reflection layer 32 and the reflectance R2 at the second reflection layer 40 to be equal to each other by adjusting the number of layers and materials of the dielectric multilayer film of the second reflection layer 40 as described earlier, the reflectance R1 at "off" time can be set low and the on-off ratio can be set high.

In this manner, in the light control apparatus 8 according to the present embodiment, an optical switching device that controls the intensity Iout of reflected light by changing the reflectance can be realized by changing the electric field to be applied to the light modulating film 34. Also, since the phase of reflected light can also be controlled by changing the refractive index of the light modulating film 34, the device may be used suitably for a hologram recording apparatus or the like.

This light control apparatus 8 being of a reflection-type structure, it is not necessary to have the incident light Iin transmitted through the substrate 30. Consequently, this light control apparatus 8 can have an improved light utilization efficiency, compared with the conventional transmissive-type light control apparatus.

In the light control apparatus 8 according to the present embodiment, a plurality of pixels 10 are arranged in a matrix, with each of the pixels 10 having a pair of electrodes, so that the reflectance can be controlled independently for each pixel and thus it can be used as a spatial light modulator SLM.

In the light control apparatus 8 according to the present embodiment, a pair of electrodes is formed by a first reflection layer 32 and s transparent electrode 36, so that an electric field can be applied uniformly in the thickness direction of the light modulating film 34 and thus the refractive index within the light modulating film 34 can be changed uniformly.

Further, in the light control apparatus 8 according to the present embodiment, a reflection-type modulator is structured, so that an opaque material can be used as the substrate 30. For example, when silicon is used as the substrate 30, transistor devices and the like can be formed within the silicon and thus an active matrix drive, in which control means for control voltage Vcnt are provided for individual pixels, can be accomplished.

Also, light use efficiency improves because use of a transparent electrode 36 as the upper electrode for applying an electric field to the light modulating film 34 can raise the aperture ratio and minimize the diffraction. The improvement in light use efficiency means the possibility of lowering the intensity Iin of incident laser light, which makes it possible to reduce power consumption.

Further, in the light control apparatus 8 according to the present embodiment, the transparent electrode 36 is formed on top of the light modulating film 34, and the second reflection layer 40 is formed on top thereof. As a result, the distance between the upper electrode and the lower electrode can be made shorter than when a transparent electrode 36 is formed on top of the second reflection layer 40, so that the electric field E applied to the light modulating film 34 can be raised. From a different viewpoint, this means the possibility of lowering the voltage to be applied between the electrodes to apply the same electric field, which makes it possible to operate the light control apparatus 8 at low voltage.

Also, in the light control apparatus 8 according to the present embodiment, the intensity Iout of reflected light is changed by controlling the reflectance R, so that it does not need a deflection plate or an analyzer and has an advantage of high light use efficiency.

Figure 6:
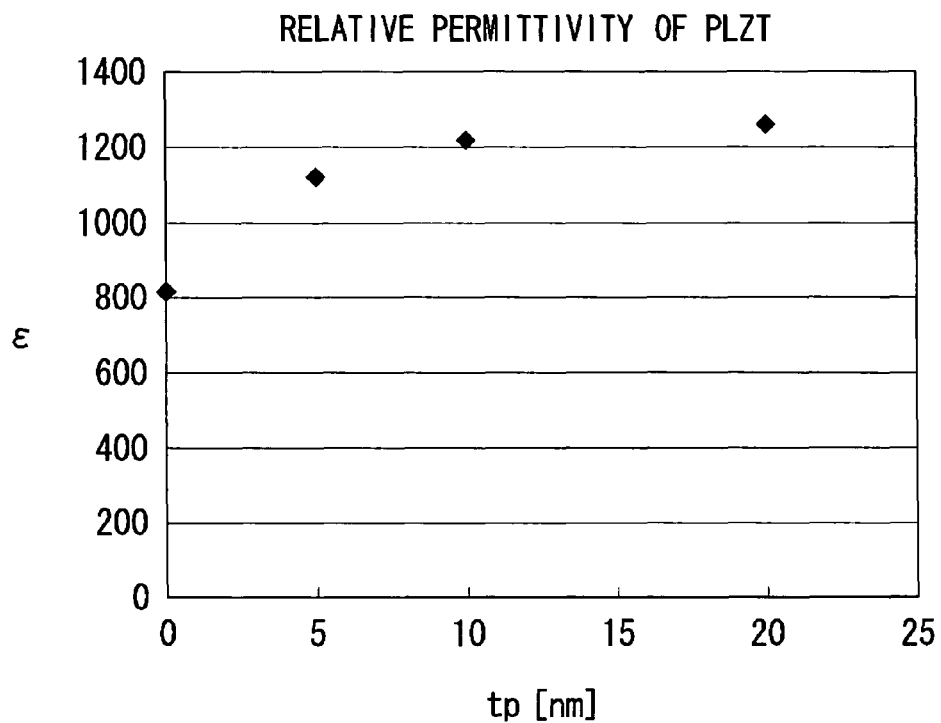
FIG. 6 is shows a relationship between a thickness tp of a protective layer and a relative permittivity ∈ of PLZT in a light control apparatus.

FIG. 6 is a chart showing a relationship between the thickness tp of the protective layer 50 and the relative permittivity $\in$ of PLZT. The figure represents the measurements of relative permittivity $\in$ with the film thickness tp of $IrO_2$ film as the parameter when an $IrO_2$ film is formed as a protective layer 50 on PLZT and a transparent electrode 36 is formed of ITO on top thereof.

When the film thickness tp of the protective layer 50 is 0 nm, that is, when the transparent electrode 36 of ITO is formed directly on the PLZT, the relative permittivity is about 800. Here, as the thickness of the protective layer 50 is increased to 5 nm and then to 10 nm, the relative permittivity becomes larger.

When the electrode on the PLZT was formed using $IrO_2$ only, whose film thickness was about 50 nm, and no electrode of ITO was formed on top thereof, the relative permittivity of the PLZT was about 1200. That is, by increasing the thickness tp of the protective layer 50, the relative permittivity of the PLZT can be brought closer to the relative permittivity when the electrode is formed using $IrO_2$ only.

From this, it can be assumed that as a result of formation of a thin film of $IrO_2$ between ITO and PLZT, the $IrO_2$ functions as a protective layer.

There are the following two probable reasons for the $IrO_2$ to function as a protective layer. Firstly, the placement of a protective layer of $IrO_2$ is considered to alleviate damage to be caused to the interface of PZLT as ITO is deposited on the PLZT. Secondly, the formation of a protective layer of $IrO_2$ may be preventing the electrical characteristics from getting aggravated by ITO diffusing inside the PLZT after the formation of the ITO electrode.

When the PLZT is used as the light modulating film 34, the higher the relative permittivity is, the better. On the other hand, since the transmissivity of light of $IrO_2$ forming a protective layer 50 is not as high as that of ITO, increasing the thickness of the protective layer 50 will bring about a drop in the transmissivity of light. Hence, it is necessary to determine the thickness tp of the protective layer 50 from the dual viewpoints of transmissivity and electrical characteristics of PLZT. As shown in FIG. 6, the thicker the thickness tp of the protective layer 50 is, the better the relative permittivity will be, and the relative permittivity apparently takes a nearly fixed value around $\epsilon=1200$. Accordingly, when the protective layer 50 is formed of $IrO_2$, its thickness of 1 nm or more can be seen to have a significant effect and further its being 3 nm to 5 nm can improve the relative permittivity by 100 or more. Further, a thicker film thickness in a range of 10 nm to 25 nm will make it possible to obtain a relative permittivity equivalent to that when the electrodes are formed of $IrO_2$ only without using ITO. The thicker the thickness of the protective layer 50 is, the more the electrical characteristics of the PLZT will be improved, but it is preferably 50 nm or less in consideration of manufacturing cost and manufacturing time.

Figure 7:
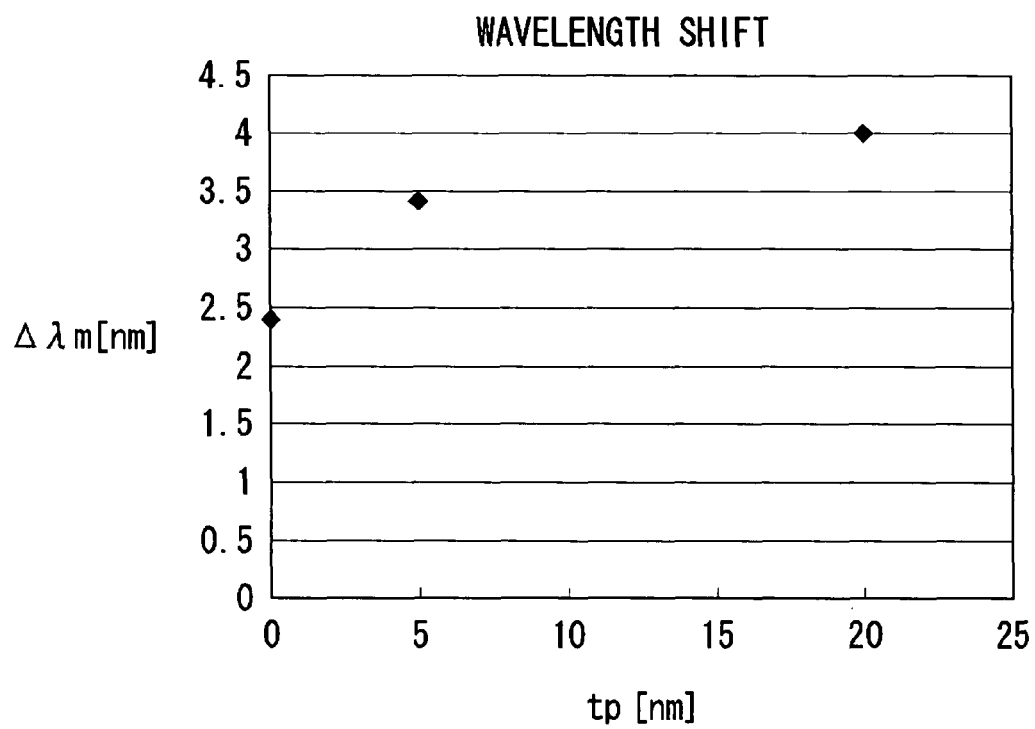
FIG. 7 is a graph showing a relationship between a thickness tp of a protective layer and a wavelength shift amount Δλm in a light control apparatus.
Figure 8:
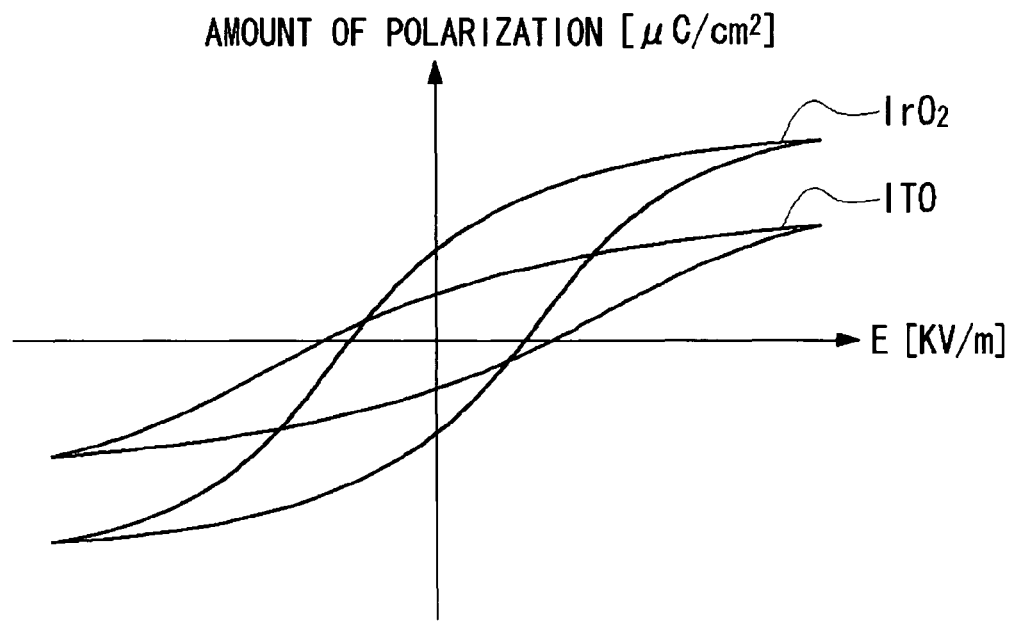
FIG. 8 is a graph showing relations between applied electric field and polarization when an opaque electrode is formed using $IrO_2$ and when a transparent electrode is formed using ITO.

As shown in FIG. 4, a light control apparatus 8 has the frequency characteristics of the reflectance wavelength-shifted by applying a voltage between the electrodes. FIG. 7 is a figure showing a relationship between the thickness tp of the protective layer 50 and the wavelength shift amount $\Delta\lambda m$ ($=\lambda m2-\lambda m1$) in the light control apparatus 8. FIG. 7 shows the wavelength shift amounts when the same electric field is applied, with the thickness of the protective layer as the parameter.

When the film thickness of the protective layer 50 is 0 nm, that is, when the transparent electrode 36 of ITO is formed directly on the PLZT, a wavelength shift amount $\Delta\lambda m$ is about 2.4 nm. As the thickness of the protective layer 50 is increased to 5 nm and then to 20 nm, the wavelength shift amount $\Delta\lambda m$ becomes larger. The wavelength shift amount $\Delta\lambda m$ and the thickness of the protective layer show a tendency similar to that of the relative permittivity in FIG. 6, and the thickness of 1 nm or more appears to have a significant effect and that of 3 nm to 5 nm can increase the wavelength shift amount by about 1 nm. Further, the thicker film thickness in a range of 10 nm to 25 nm can achieve an improvement of about 1.5 nm.

As shown in FIG. 4, the larger the wavelength shift amount $\Delta\lambda m$, the higher the on-off ratio of the reflectance of the light control apparatus 8 can be, so that the thickness is preferably in a range of 3 nm to 25 nm.

Setting the thickness of the protective layer 50 in this range can suppress the drop in the transmissivity of light and at the same time raise the light utilization efficiency of the light control apparatus 8.

As described above, use of a structure including a light modulating film 34, a protective layer 50 and a transparent electrode 36 can suppress the drop in the transmissivity of light due to the electrode and at the same time realize a light control apparatus 8 capable of excellent modulation.

Thus far, the second embodiment has been described. This embodiment is merely exemplary, and it is understood by those skilled in the art that various modifications are possible and those modifications are also within the scope of the present invention.

According to this embodiment, a description has been given of a case where the combination of a light modulating film 34, a protective layer 50 and a transparent electrode 36 is PLZT, $IrO_2$ and ITO, but this should not be considered as limiting. PZT may be used in place of PLZT, and ZnO may be used in place of ITO. Also, as the protective layer 50, $SrRuO_3$ or $La_{0.5}Sr_{0.5}CoO_3$ may be used. The effect as described in the embodiment can be achieved by an arbitrary combination of these materials.

In this embodiment, a description has been given of a case where a pair of electrodes is formed by a transparent electrode 36 as the upper electrode and a first reflection layer 32 as the lower electrode, but this should not be considered as limiting. For example, the electrode pair that applies an electric field to the light modulating film 34 may be formed as a comb-shaped electrode on top of the light modulating film 34. At this time, an electric field is applied in the horizontal direction relative to the light modulating film 34.

In this case, too, it is desirable that the comb-shaped electrode be a transparent electrode formed of ITO or the like, and formation of a protective film between the transparent electrode 36 and the PLZT film, which is the light modulating film 34, can suppress the degradation of the electrical characteristics of the light modulating film 34.

The second reflection layer 40 may be a half mirror formed of a metal thin film. In such a case, the manufacturing process can be more simplified than when a dielectric multilayer film is formed. Also, it can be expected that the protective layer 50 reduces the effect of the metal thin film of the half mirror on the light modulating film 34.

In this embodiment, a description has been given of a case where a light control apparatus 8 is used as the spatial light modulator of a hologram recording apparatus 70, but this should not be considered as limiting. It may be used in display apparatuses, optical communication switches, optical communication modulators, optical arithmetic units, encryption circuits, etc.

In this embodiment, a description has been given of a case where an electro-optical material is used as the light modulating film 34 and an electrode pair for applying an electric field to the light modulating film 34 is provided. The present invention, however, may use a magneto-optical material as the light modulating film 34, and in such a case, the electrode pair for applying an electric field may be replaced by a magnetic field applying means for applying an magnetic field.

Third Embodiment

A light control apparatus according to a third embodiment of the present invention will be described in outline. This light control apparatus is a light modulator which changes its reflectance by the application of voltage from outside. This light control apparatus, which has a Fabry-Perot resonator structure, is provided with a light modulating film, which has the refractive index changed by the electric field applied, and two reflection layers provided in such a way as to hold the light modulating film in between. The light control apparatus constitutes a light control system together with a laser light source and an optical system. Laser light is introduced into the light control apparatus at a predetermined incident angle. The laser light reflected by the light control apparatus has an intensity proportional to the reflectance of the light control apparatus, so that the reflected light can be put to a variety of applications by recording or detecting it by a recording medium or a light detecting device or the like.

FIG. 2A shows a plan view of a light control apparatus 8 according to the present embodiment. The light control apparatus 8 is provided with a plurality of pixels 10 which are arranged two-dimensionally in eight rows and eight columns on a substrate 30. Each pixel 10 is structured in a size of about 20 μm×20 μm. Inputted to each pixel 10 is a control signal CNT for control of the reflectance from outside.

FIG. 2B shows an A-A' cross-sectional view of a light control apparatus shown in FIG. 2A. The light control apparatus 8 includes a substrate 30, a first reflection layer 32, a light modulating film 34, a transparent electrode 36, a wiring 38, and a second reflection layer 40.

The light control apparatus 8 according to the present embodiment is formed on the substrate 30. Glass, silicon, or the like with a flat surface may preferably be used as material for this substrate 30.

The first reflection layer 32 is formed on the substrate 30. A metallic material, such as Pt, may preferably be used as material for the first reflection layer 32. The thickness of the first reflection layer 32 should be about 200 nm. According to the present embodiment, the first reflection layer 32 is formed of Pt, and this first reflection layer 32 functions also as an electrode for applying an electric field to the light modulating film 34 as will be described later.

When the first reflection layer 32 is formed of Pt, the reflectance of the first reflection layer 32 is about 60% to 80%.

The light modulating film 34 is provided on the top surface of the first reflection layer 32. To be selected as the material for this light modulating film 34 is a solid electro-optical material whose refractive index changes with the electric field applied. Although such electro-optical materials that can be used include PLZT, PZT, LiNbO$_3$, GaA-MQW, SBN((Sr,Ba) Nb$_2$O$_6$), and the like, PLZT, in particular, is preferably used. The thickness t of the light modulating film 34, which is determined according to the incident angle and wavelength of entering light, should preferably be formed in a range of 500 nm to 1500 nm when the entering light is, for instance, a red light near 650 nm. As will be described later, an electric field applied to the light modulating film 34 is applied in the thickness direction thereof, so that if the film thickness is 1500 nm or more, it will be difficult to apply an electric field that can produce a sufficient change in refractive index. Also, if the film thickness is 500 nm or less, then it will be impossible to obtain a sufficient optical film thickness change Δnt.

The transparent electrode 36 is provided on the top surface of the light modulating film 34. The transparent electrode 36 may, for instance, be formed of ITO (Indium Tin Oxide), ZnO, IrO$_2$, or the like. When the transparent electrode 36 is formed of ITO or ZnO, the thickness thereof should be about 100 nm to 150 nm. When it is formed of IrO$_2$, the film thickness should preferably be thinner, that is, about 50 nm, for instance. This transparent electrode 36 has a trade-off relationship between resistance and transmittance, so that the thickness thereof may be determined experimentally.

This transparent electrode 36 is formed in such a manner as to be arranged in a matrix for all pixels 10 respectively.

The second reflection layer 40 is formed on the top surface of the transparent electrode 36. This second reflection layer 40 is comprised of a dielectric multilayer film, which is a stack of alternating first dielectric film 42 and second dielectric film 44 having different refractive indices. A combination of materials that can be used for the first dielectric film 42 and second dielectric film 44 may be SiO$_2$ (n=1.48) and Si$_3$N$_4$ (n=2.0).

If the dielectric multilayer film is to be formed of silicon oxide films and silicon nitride films, it will be possible to use exactly the same manufacturing process and manufacturing equipment of silicon semiconductor integrated circuits.

The dielectric multilayer film may be formed by a plasma CVD (Chemical Vapor Deposition) method. The SiO$_2$ film may be grown in an atmosphere of TEOS and O$_2$ at the temperature of 200° C. and the Si$_3$N$_4$ film may be grown suitably in an atmosphere of SiH$_4$ and NH$_3$ at the temperature of 200° C.

The dielectric multilayer film may also be formed by an ion beam sputtering method.

The thicknesses t1 and t2 respectively of the first dielectric film 42 and second dielectric film 44 are so designed as to be ¼ of the wavelength of light entering the light control apparatus 8. That is, if the wavelength of light entering the light control apparatus 8 is λ and the refractive index of the dielectric film is n, the thickness t for each layer of the dielectric films is so adjusted as to be t=λ/(n×4).

For example, suppose that a red laser light of wavelength λ=633 nm is used for a light control apparatus 8, then the thickness t1 of the first dielectric film 42 will approximately be t1=633/(4×1.48)=106 nm where the material used is SiO$_2$ (n=1.48). Likewise, the thickness t2 of the second dielectric film 44 will approximately be t2=633/(4×2)=79 nm where the material used is Si$_3$N$_4$ (n=2.0). It is not always necessary that the thicknesses t1 and t2 of the dielectric films constituting the second reflection layer 40 be designed to be exactly λ/4.

As material for the dielectric film, TiO$_3$ (n=2.2) may be used instead of silicon nitride film. In this case, the thickness t2 of the second dielectric film 44 should approximately be t2=633/(4×2.2)=72 nm.

In FIG. 2B, the reflectance R2 of light entering a second reflection layer 40 from a light modulating film 34 is so designed as to be equal to the reflectance R1 of light entering a first reflection layer 32 from the light modulating film 34. The reflectance R1 is determined by the metallic material used for the first reflection layer 32, and is 60 to 80% when Pt is selected.

At this time, therefore, the reflectance R2 is also designed to be 60 to 80%. The reflectance R2 of the second reflection layer 40 can be adjusted by the materials and thicknesses of the first dielectric films 42 and the second dielectric films 44. According to the present embodiment, the second reflection layer 40, as shown in FIG. 2, is a stack of alternating three layers each of the first dielectric films 42 and the second dielectric films 44. In the second reflection layer 40, the stacking order of the first dielectric films 42 and the second dielectric films 44 may be reversed. Also, a third dielectric film may be further stacked in order to fine-adjust the reflectance R2.

The second reflection layer 40 may be a half mirror that is formed by a metal thin film. In such a case, the manufacturing process can be more simplified than when a dielectric multilayer film is formed.

The second reflection layer 40 has openings, and the transparent electrode 36 is led to the outside through via holes and wiring 38. As material for the wiring 38, Al or the like is used preferably.

On the top surface of the wiring 38, a protective film may further be formed.

In the present embodiment, a transparent electrode 36 and a first reflection layer 32 form a pair of electrodes. The potential of the first reflection layer 32 is, for instance, fixed to ground potential, whereas the potential of the transparent electrode 36 of each pixel is controlled by the control signal CNT.

A description will be given of the operation of a light control apparatus 8 configured as described above.

Figure 9:
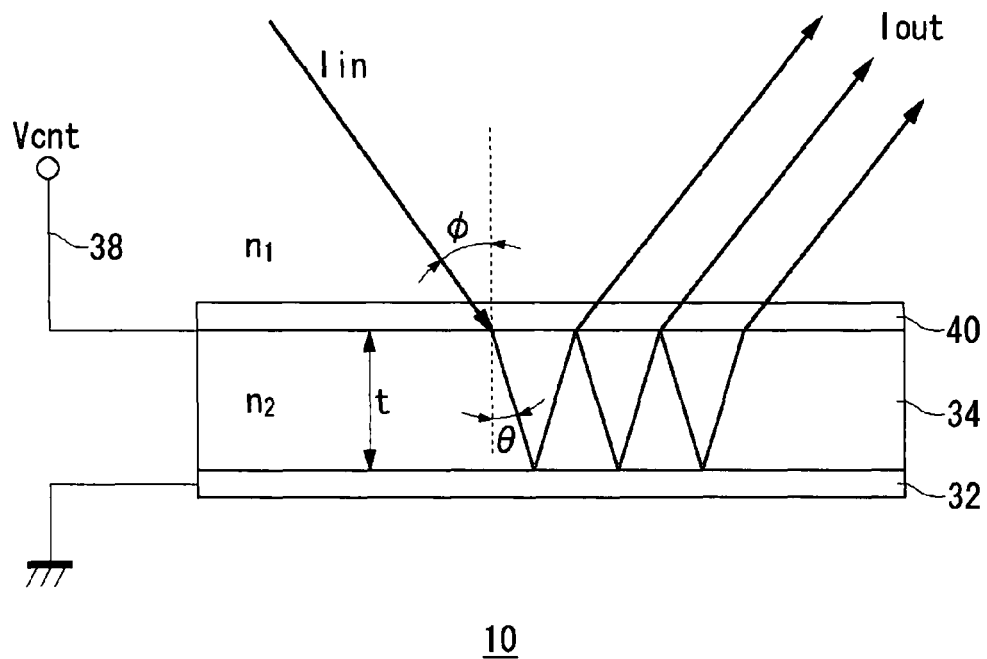
FIG. 9 illustrates schematically a state of operation of one pixel of a light control apparatus shown in FIGS. 2A and 2B.

FIG. 9 illustrates schematically a state of operation of one pixel 10 of the light control apparatus 8. In the figure, the same components as those in FIGS. 2A and 2B are denoted by the same reference numerals. Also, for simplicity, components, such as a transparent electrode 36, are omitted. The $n_1$ and $n_2$ in the figure represent the refractive indices.

From above the light control apparatus 8, laser light of intensity Iin is introduced. A first reflection layer 32, a light modulating film 34 and a second reflection layer 40 of the light control apparatus 8 constitute a Fabry-Perot resonator, and part of the incident light is entrapped therewithin and part thereof is reflected. If the intensity of incident laser light is Iin and the intensity of laser light reflected by the light control apparatus 8 is Iout, the reflectance R of the light control apparatus 8 will be defined as R=Iout/Iin.

FIG. 4 shows a relationship between the wavelength λ of light incident on a light control apparatus 8 and the reflectance R thereof.

The Fabry-Perot resonator constituted by a first reflection layer 32, a light modulating film 34 and a second reflection layer 40 has a resonance wavelength of $\lambda m = 2 n_2 t \cos \theta / m$, where m is a degree, $n_2$ is the refractive index of the light modulating film 34, t is the thickness of the light modulating film 34, and θ is the incident angle of laser light at the light modulating film 34. As shown in FIG. 4, the reflectance R of the light control apparatus 8 takes the minimum value at the resonance wavelength λm.

As described above, the refractive index n of the light modulating film 34 is dependent on the electric field applied to the pair of electrodes. Now, if the first reflection layer 32 is at ground potential and a control voltage Vcnt is applied to the not-shown transparent electrode 36, an electric field E=Vcnt/t will be applied to the light modulating film 34 in the thickness direction. Between the variation Δn in the refractive index $n_2$ of the light modulating film 34 and the applied electric field E, there exists a relationship $\Delta n = \frac{1}{2} \times (n_2)^3 \times R \times E^2$, where R is an electro-optical constant (Kerr constant).

(I) in FIG. 4 represents reflection characteristics when the control voltage Vcnt is not applied.

Now, if a voltage V1 as the control voltage Vcnt is applied to the transparent electrode 36 of each pixel 10, the refractive index of the light modulating film 34 will change and the resonance wavelength of the resonator will shift from λm1 to λm2. The reflection characteristics at this time is represented by (II) in FIG. 4.

If the wavelength of laser light incident on the light control apparatus 8 is λm1, then changing the control voltage Vcnt from ground potential to a voltage V1 will cause a shift of the resonance wavelength and consequently a change of the reflectance of the light control apparatus 8 from Rm1 to Rm2.

Here, the ratio Ron/Roff of the reflectance Ron when no voltage is applied to the reflectance Roff when a voltage is applied is defined as an on-off ratio. When the intensity Iin of incident light is constant, the intensity Iout of reflected light is proportional to the reflectance. Accordingly, a larger on-off ratio means a better accuracy with which the intensity Iout of reflected light can be controlled.

The closer the reflectance R1 at the first reflection layer 32 and the reflectance R2 at the second reflection layer 40 are to each other, the lower the reflectance R of the light control apparatus 8 at resonance wavelength λm will be. Hence, by designing the reflectance R1 at the first reflection layer 32 and the reflectance R2 at the second reflection layer 40 to be equal to each other by adjusting the number of layers and materials of the dielectric multilayer film of the second reflection layer 40 as described earlier, the reflectance R1 at "off" time can be set low and the on-off ratio can be set high.

In this manner, in the light control apparatus 8 according to the present embodiment, an optical switching device that controls the intensity Iout of reflected light by changing the reflectance can be realized by changing the electric field to be applied to the light modulating film 34. Also, since the phase of reflected light can also be controlled by changing the refractive index of the light modulating film 34, the device may be used suitably for a hologram recording apparatus or the like. This light control apparatus 8 being of a reflection-type structure, it is not necessary to have the incident light Iin transmitted through the substrate 30. Consequently, this light control apparatus 8 can have an improved light use efficiency, compared with the conventional transmissive-type light control apparatus.

Next, a description will be given of a light control system 200 according to the present embodiment, which is configured using the above-described light control apparatus 8.

Figure 10:
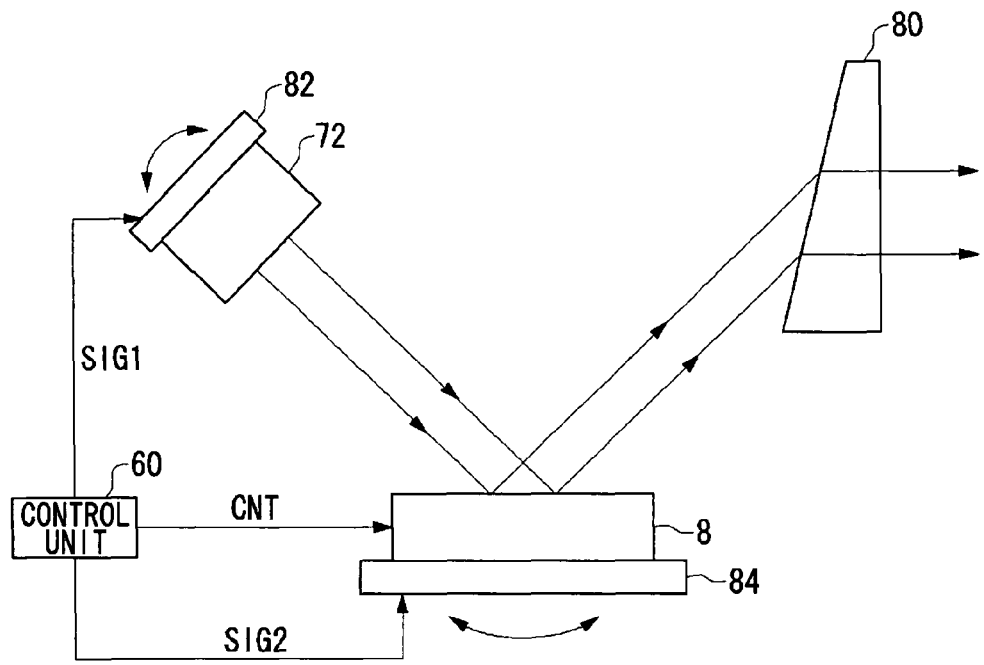
FIG. 10 is an illustration showing a structure of a light control system according to an embodiment.

FIG. 10 is an illustration showing a structure of a light control system 200 according to the present embodiment. The light control system 200 includes a laser light source 72, a light control apparatus 8, a prism 80, and a control unit 60. The laser light source 72, which includes a laser diode, and an optical system comprised of a beam expander and the like, outputs laser light by enlarging the beam diameter of laser light output from the laser diode and collimating it.

The laser light source 72 is installed on a movable mounter 82. The movable mounter 82 is so structured as to be tiltable around a predefined axis as the center so that the direction of the optical axis of the laser light source 72 can be changed. The orientation of the movable mounter 82 is adjusted by an actuator or the like.

The laser light output from the laser light source 72 is introduced into the light control apparatus 8 at a predetermined incident angle. In the present embodiment, the laser light is so designed as to enter at $\Phi=45°$ from the normal direction of the light control apparatus 8 before a correction processing to be described later. The light control apparatus 8 includes a plurality of pixels arranged in a matrix as shown in FIG. 2A, and the reflectance is controlled for each pixel by control signal CNT output from the control unit 60. The light control apparatus 8 is installed on a movable mounter 84. The movable mounter 84, which is axially supported, is so structured that the installation angle relative to the laser light output from the laser light source 72 can be adjusted. The movable mounter 84 is controlled by an actuator or the like in the same way as the movable mounter 82.

The control unit 60 controls the direction of the optical axis of the laser light source 72 by outputting angle control signals SIG1 and SIG2 to the movable mounters 82 and 84.

The laser light reflected by the light control apparatus 8 is introduced into the prism 80. The light path of the laser light is changed by the prism 80, and the laser light is led to a not-shown recording medium, light detector or the like.

Referring back to FIG. 9, a description will be given of an operation of a light control system 200 configured as described above. As described earlier, the resonance wavelength of a light control apparatus 8 is given by $\lambda m = 2n_2 t \cos \theta / m$.

If the refractive index of the light modulating film 34 is $n_2 = 2.0$ and the change in refractive index resulting from the presence and absence of application of an electric field is $\Delta n = 0.01$, then the resonance wavelength $\lambda_m$ will shift only by 0.5%.

On the other hand, the resonance wavelength $\lambda_m$ is also proportional to the thickness t of the light modulating film 34. Accordingly, if the thickness t varies by 1%, the resonance wavelength $\lambda m$ will vary by 1%, too. Also, since there are cases where the refractive index $n_2$ of the light modulating film 34 also varies, it is probable that the resonance wavelength $\lambda m$ varies as a result.

If the resonance wavelength $\lambda m$ varies, the reflectance Rm1 when a voltage is not applied to the light modulating film 34 varies as shown in FIG. 4, and consequently the on-off ratio of the light control apparatus 8 drops.

To make the resonance wavelength $\lambda m$ of the light control apparatus 8 take a constant value irrespective of the variation in characteristics of the light modulating film 34, $\cos \theta$ may be adjusted such that $n_2 \times t \times \cos \theta$ takes a constant value.

Therefore, in the light control system 200 of FIG. 10, the incident angle $\phi$ of laser light to the light control apparatus 8 is adjusted by the movable mounters 82 and 84 according to the variation in the film thickness t and refractive index $n_2$ of the light modulating film 34.

Figure 11:
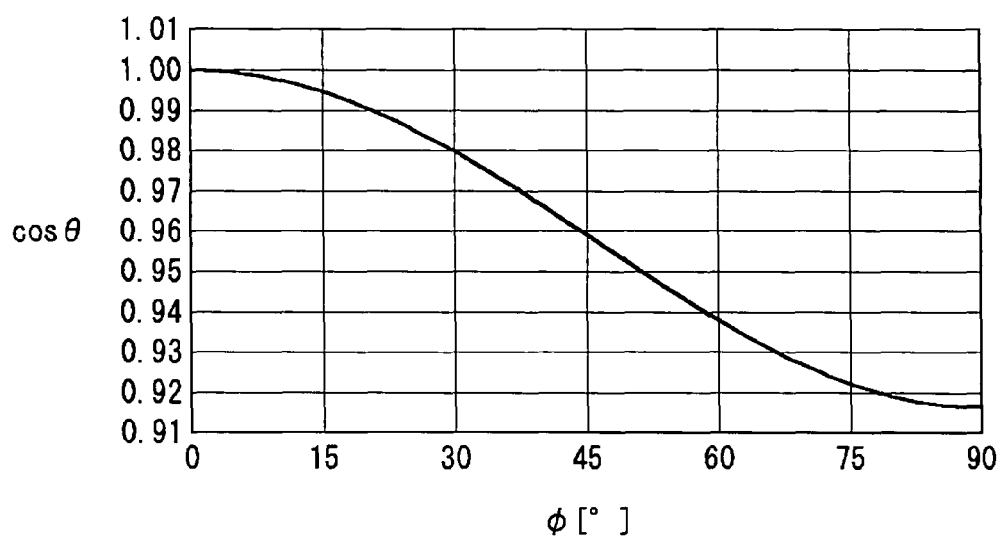
FIG. 11 is a graph showing a relationship between an incident angle φ of laser light and cos θ.

In FIG. 9, $n_1 \cdot \sin \phi = n_2 \cdot \sin \theta$ holds for the incident angle $\phi$ of laser light and the incident angle $\theta$ of laser light within the light modulating film 34 by Snell's law. FIG. 11 is a graph showing a relationship between the incident angle $\phi$ of laser light and $\cos \theta$, where calculations are based on $n_1 = 1$ and $n_2 = 2.5$. As is indicated by FIG. 11, when the incident angle $\phi$ of laser light is changed in a range of ±5° about the initial condition of 45° as the center, the value of $\cos \theta$ changes in a range of about ±1%. Therefore, even when there has been a variation of ±1% in the value of $n_{2x}t$ in the manufacturing process of the light modulating film 34, the variation of the resonance wavelength $\lambda m$ can be suppressed by adjusting the incident angle $\phi$ of laser light.

In a light control system 200 of FIG. 10, the adjustment of the incident angle $\phi$ of laser light to the light control apparatus 8, that is, the correction of the resonance wavelength $\lambda m$ is carried out as explained below.

In carrying out correction, a light detecting device, such as a photodiode or CCD (Charge Coupled Device), is placed posterior to the prism 80. And the laser light output from the laser light source 72 is introduced into the light control apparatus 8 at an incident angle of $\phi = 45°$. At this time, a control voltage Vcnt that makes the reflectance take the minimum value is applied to each pixel of the light control apparatus 8. According to the present embodiment, it is so designed that the reflectance becomes minimum when Vcnt=0.

As shown in FIG. 4, if the film thickness t and refractive index $n_2$ of the light modulating film 34 are close to the design values, the reflectance when the wavelength of the incident laser light is $\lambda m1$ will be Rm1, so that the intensity of the laser light incident on the light detecting device will be low. Conversely, if the film thickness t and refractive index $n_2$ of the light modulating film 34 vary, then the resonance wavelength will shift, so that the intensity of the laser light detected by the light detecting device will go higher.

Thus, the control unit 60 can correct the resonance wavelength $\lambda m$ by adjusting the incident angle $\phi$ of laser light to the light control apparatus 8 by adjusting the installation angles of the movable mounters 82 and 84 by angle control signals SIG1 and SIG2 in such a manner that the detected intensity of laser light at the light sensing device may get closer to the minimum value.

Changing the incident angle $\phi$ of laser light results in a distortion in one direction of the image of laser light reflected by the light control apparatus 8, but the distortion of an image caused by the changing of the incident angle $\phi$ can be corrected by placing the prism 80.

As described above, in a light control system 200 according to the present embodiment, the shift of resonance wavelength $\lambda m$ resulting from manufacturing variation of the light modulating film 34 of the light control apparatus 8 can be corrected by adjusting the incident angle $\phi$ of laser light to the light control apparatus 8.

Conventionally, when the light modulating film 34 was to be formed of PLZT or the like, there was the problem that the light control system 200 cost a lot because expensive manufacturing equipment was required to enable a manufacture with stable film thickness t and refractive index $n_2$ thereof and besides it was necessary to check the workmanship of the light modulating film 34 for each light control apparatus 8. However, as described above, the resonance wavelength $\lambda m$ can be corrected simply and easily by providing the light control system 200 with a means for adjusting the incident angle of laser light, and thus the yield in the production of the light control apparatus 8 can be raised.

Thus far, the third embodiment has been described. This embodiment is merely exemplary and it is understood by those skilled in the art that various modifications are possible and those modifications are also within the scope of the present invention.

In this embodiment, a description has been given of a case where a pair of electrodes is formed by a transparent electrode 36 as the upper electrode and a first reflection layer 32 as the lower electrode, but this should not be considered as limiting. For example, the electrode pair that applies an electric field to the light modulating film 34 may be formed as a comb-shaped electrode on top of the light modulating film 34. At this time, an electric field is applied in the horizontal direction relative to the light modulating film 34. In this case, too, the resonance wavelength $\lambda m$ can be corrected by adjusting the incident angle $\phi$ of laser light according to the film thickness of the light modulating film 34.

In this embodiment, a description has been given of a case where the movable mounters 82 and 84 are provided with actuators or the like as means for adjusting the incident angle φ of laser light to the light control apparatus 8 and the incident angle is adjusted by angle control signals SIG1 and SIG2 output from the control unit 60, but the incident angle may be adjusted manually.

In this embodiment, a description has been given of a case where the movable mounters 82 and 84 are used as means for adjusting the incident angle φ of laser light to the light control apparatus 8, but this should not be considered as limiting. For example, laser light output from the laser light source 72 may be directed to a mirror and the laser light reflected by the mirror may be inputted to the light control apparatus 8. In this case, the incident angle φ can also be adjusted by adjusting the angle of the mirror.

Further, in this embodiment, a description has been given of a case where corrections are made of the variation in the resonance wavelength resulting from the variation in the thickness or refractive index of the light modulating film 34 of the light control apparatus 8, but this should not be considered as limiting. For example, in such cases as changing the wavelength of laser light incident on the light control apparatus 8, the resonance wavelength of the light control apparatus 8 may be changed according to the wavelength of the laser light.

In this embodiment, the distortion of an image is corrected by the prism 80, but a similar function can be realized by a combination of a plurality of mirrors and lenses.

A light control system 200 as described in this embodiment can be used not only as the spatial light modulator of a hologram recording apparatus but also in display apparatuses, optical communication switches, optical communication modulators, optical arithmetic units, encryption circuits, etc.

In this embodiment, a description has been given of a case where an electro-optical material is used as the light modulating film 34 and an electrode pair for applying an electric field to the light modulating film 34 is provided. The present invention, however, may use a magneto-optical material as the light modulating film 34, and in such a case, the electrode pair for applying an electric field may be replaced by a magnetic field applying means for applying an magnetic field.

The present invention may further be applied to other Fabry-Perot resonators and may be widely applied to resonators which are formed by two reflection layers and a thin film held therebetween and whose length cannot be easily adjusted after the manufacture of the resonator.

Fourth Embodiment

A light modulating apparatus according to a fourth embodiment of the present invention will be described in outline. This light modulating apparatus is a light modulating apparatus which changes its reflectance by the application of voltage from outside. This light modulating apparatus, which has a Fabry-Perot resonator structure, is provided with a light modulating film, which has the refractive index changed by the electric field applied and two reflection layers provided in such a way as to hold the light modulating film in between. When a control signal is supplied in the state where the laser light is incident on the light modulation apparatus, the reflectance of the light modulating apparatus can be varied and the intensity of the laser light reflected can be controlled. The laser light reflected by the light modulating apparatus has the intensity proportional to the reflectance. Hence it can be used for various applications when this reflected light is recorded or detected by a recording medium, a light detecting device or the like.

Figure 12:
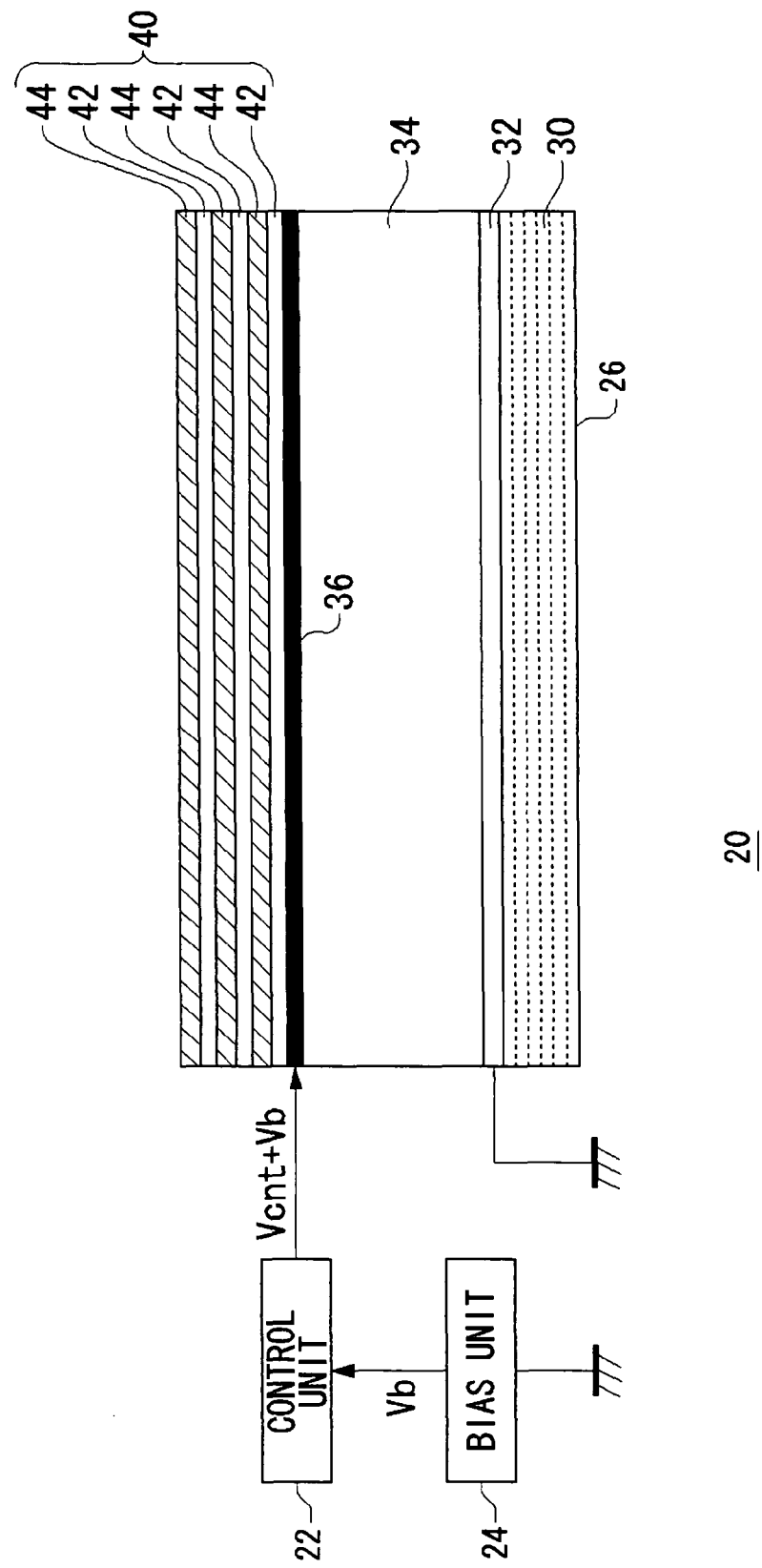
FIG. 12 shows a structure of a light modulating apparatus according to an embodiment.

FIG. 12 shows a structure of a light modulating apparatus according to the present embodiment. The light modulating apparatus 20 includes a control unit 22, a bias unit 24 and a resonator 26. The resonator 26 shown in FIG. 12 is a cross-sectional view of the resonator 26. The resonator 26 includes a substrate 30, a first reflection layer 32, a light modulating film 34, a transparent electrode and a second reflection layer 40.

The resonator 26 is formed on the substrate 30. Glass, silicon, or the like with a flat surface may preferably be used as material for this substrate 30. For instance, when the substrate 30 is formed of silicon, a switching element may be provided on a substrate and the resonator 26 may be formed on the switching element.

The first reflection layer 32 is formed on the substrate 30. A metallic material, such as Pt, may preferably be used as material for the first reflection layer 32. The thickness of the first reflection layer 32 is set to about 200 nm. According to the present embodiment, the first reflection layer 32 is formed of Pt, and this first reflection layer 32 also functions as an electrode for applying an electric field to the light modulating film 34 as will be described later. When the first reflection layer 32 is formed of Pt, the reflectance of the first reflection layer 32 is about 50% to 80%.

The light modulating film 34 is provided on the top surface of the first reflection layer 32. As the material for this light modulating film 34, a solid electro-optical material whose refractive index changes with the electric field applied is selected. Although such electro-optical materials that can be used include PLZT, PZT (lead zirconate titanate), $LiNbO_3$, GaA-MQW, $SBN((Sr,Ba)Nb_2O_6)$ and the like, PLZT, in particular, is preferably used. The thickness t of the light modulating film 34, which is determined according to the incident angle and wavelength of incoming light, should preferably be formed in a range of 500 nm to 1500 nm when the incident light is, for instance, a red light near 650 nm. As will be described later, an electric field applied to the light modulating film 34 is applied in the thickness direction thereof, so that if the film thickness is 1500 nm or more, it will be difficult to apply an electric field that can produce a sufficient change in refractive index. Also, if the film thickness is 500 nm or less, then it will not be possible to obtain a sufficient optical film thickness change ΔAnt.

The transparent electrode 36 is provided on the top surface of the light modulating film 34. The transparent electrode 36 may, for instance, be formed of ITO (Indium Tin Oxide), ZnO, $IrO_2$, or the like. When the transparent electrode 36 is formed of ITO or ZnO, the thickness thereof shall be about 100 nm to 150 nm. When it is formed of $IrO_2$, the film thickness is preferably thinner, that is, about 50 nm, for instance. This transparent electrode 36 has a trade-off relationship between resistance and transmittance, so that the thickness thereof may be determined experimentally.

The second reflection layer 40 is formed on the top surface of the transparent electrode 36. This second reflection layer 40 is comprised of a dielectric multilayer film, which is a stack of alternating first dielectric film 42 and second dielectric film 44 having different refractive indices. A combination of materials that can be used for the first dielectric film 42 and second dielectric film 44 may be $SiO_2$ (n=1.48) and $Si_3N_4$ (n=2.0).

If the dielectric multilayer film is to be formed of silicon dioxide films and silicon nitride films, it will be possible to use exactly the same manufacturing process and manufacturing equipment of silicon semiconductor integrated circuits.

The dielectric multilayer film can be formed by a plasma CVD (Chemical Vapor Deposition) method. The $SiO_2$ film can be grown in an ambience of TEOS and $O_2$ at the temperature of 200° C. and the $Si_3N_4$ film can be grown suitably in an ambience of $SiH_4$ and $NH_3$ at the temperature of 200° C. The dielectric multilayer film may also be formed by an ion beam sputtering method.

The thicknesses t1 and t2 respectively of the first dielectric film 42 and second dielectric film 44 are so designed as to be ¼ of the wavelength of light entering the resonator 26. That is, if the wavelength of light entering the resonator 26 is λ and the refractive index of the dielectric film is n, the thickness t for each layer of the dielectric films is so adjusted as to be t=λ/(n×4).

For example, suppose that a red laser light of wavelength λ=633 nm is used for a light modulating apparatus 20, then the thickness t1 of the first dielectric film 42 will approximately be t1=633/(4×1.48)=106 nm if the material used is $SiO_2$ (n=1.48). Likewise, if the material used is $Si_3N_4$ (n=2.0), the thickness t2 of the second dielectric film 44 will approximately be t2=633/(4×2)=79 nm. It is not always necessary that the thicknesses t1 and t2 of the dielectric films constituting the second reflection layer 40 be designed to be exactly λ/4.

As material for the dielectric film, $TiO_3$ (n=2.2) may be used instead of silicon nitride film. In this case, the thickness t2 of the second dielectric film 44 is set approximately to t2=633/(4×2.2)=72 nm.

In FIG. 12, the reflectance R2 of light entering a second reflection layer 40 from a light modulating film 34 is so designed as to be equal to the reflectance R1 of light entering a first reflection layer 32 from the light modulating film 34. The reflectance R1 is determined by the metallic material used for the first reflection layer 32, and is 50 to 80% when Pt is selected.

At this time, therefore, the reflectance R2 is also designed to be 50 to 80%. The reflectance R2 of the second reflection layer 40 can be adjusted by the materials and thicknesses of the first dielectric films 42 and the second dielectric films 44. According to the present embodiment, the second reflection layer 40, as shown in FIG. 12, is a stack of alternating three layers each of the first dielectric films 42 and the second dielectric films 44. In the second reflection layer 40, the stacking order of the first dielectric films 42 and the second dielectric films 44 may be reversed. Also, a third dielectric film may be further stacked in order to fine-adjust the reflectance R2.

The second reflection layer 40 may be a half mirror formed of a metal thin film. In such a case, the manufacturing process can be more simplified than when a dielectric multilayer film is formed.

In the present embodiment, a transparent electrode 36 and a first reflection layer 32 form a pair of electrodes. As shown in FIG. 12, the transparent electrode 36 is connected with the control unit 22, and a control voltage is applied thereto.

The control unit 22 has a function of generating and outputting a control voltage Vcnt by which to modulate the light having entered the light modulating apparatus 20 and output it. The control voltage Vcnt is a signal which takes either of two values which are high level VH and low level VL.

The bias unit 24 generates a bias voltage Vb by which to adjust the resonance wavelength of the resonator 26 and outputs it. The bias voltage Vb is added to the control voltage Vcnt by the bias unit 24, and the control voltage Vcnt is applied to the transparent electrode 36. A structure of the bias unit 24 and a method for setting the bias voltage Vb will be described later. The first reflection layer 32 is a ground potential, for example.

Figure 13:
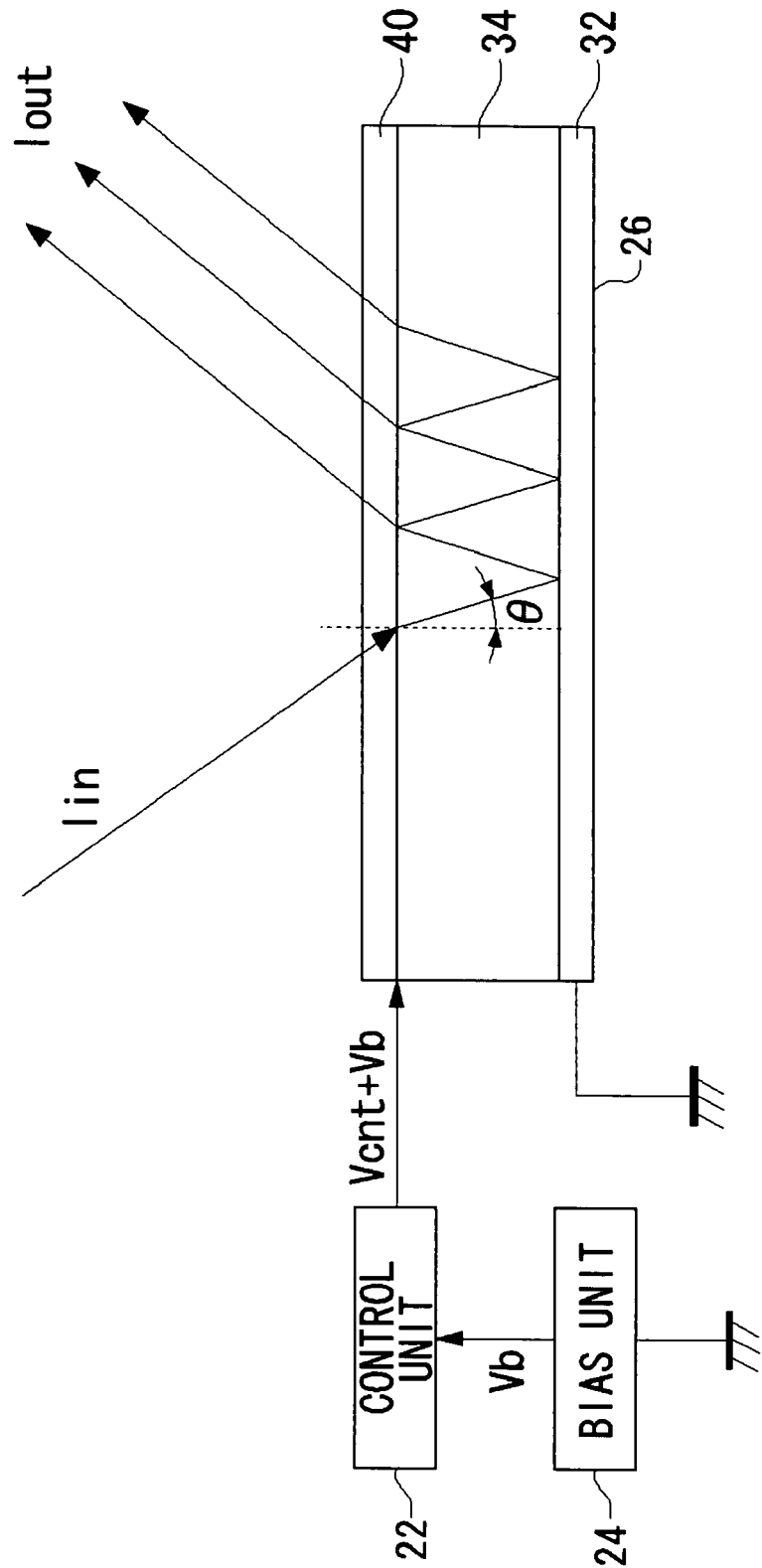
FIG. 13 illustrates schematically an operating state of a light modulating apparatus.

A description will be given of the operation of a light modulating apparatus 20 configured as described above. FIG. 13 illustrates schematically an operating state of the light modulating apparatus 20. In the figure, the same components as those in FIG. 12 are denoted by the same reference numerals. Also, for simplicity, components, such as a transparent electrode 36, are omitted.

From above the resonator 26, laser light of intensity Iin is introduced. A first reflection layer 32, a light modulating film 34 and a second reflection layer 40 of the resonator 26 constitute a Fabry-Perot resonator, and part of the incident light is entrapped therewithin and part thereof is reflected. If the intensity of incident laser light is Iin and the intensity of laser light reflected by the resonator 26 is Iout, the reflectance R of the resonator 26 will be defined as R=Iout/Iin.

FIG. 4 shows a relationship between the wavelength λ of light incident on a light control apparatus 8 and the reflectance R thereof. The Fabry-Perot resonator constituted by a first reflection layer 32, a light modulating film 34 and a second reflection layer 40 has a resonance wavelength λm expressed by Equation 1. Here, n is the refractive index of the light modulating film 34, t is the thickness of the light modulating film 34, and θ is the incident angle of laser light in the light modulating film 34. As shown in FIG. 4, the reflectance R of the resonator 26 takes the minimum value at the resonance wavelength $λ_m$. θ may be set to 0° so that the incident angle is zero.

As described above, the refractive index n of the light modulating film 34 is dependent on the electric field applied to the pair of electrodes. Between the variation Δn in the refractive index n of the light modulating film 34 and the applied electric field E, there exists a relationship $Δn=½×(n)^3×R×E^2$ (Equation 2) where R is an electro-optical constant (Kerr constant).

(I) shown in FIG. 4 represents reflection characteristics when the control voltage Vcnt is not applied. Then, the resonance wavelength of the resonator 26 is λm1. When voltage is applied to the resonator 26, the refractive index of the light modulating film 34 changes and the resonance wavelength shifts from λm1 to λm2. λm2 has a value greater than λm1. The reflection characteristics at this time is represented by (II) in FIG. 4.

Now, if the wavelength of laser light incident on the resonator 26 is λm1, then the application of voltage to the resonator 26 will cause a shift of the resonance wavelength from λm1 to λm2 and thereby the reflectance R of the resonator 26 will change from Rm1 to Rm2.

Here, the ratio Ron/Roff of the reflectance Ron when no voltage is applied to the reflectance Roff when a voltage is applied is defined as an on-off ratio. When the intensity Iin of incident light is constant, the intensity Iout of reflected light is proportional to the reflectance. Accordingly, a larger on-off ratio allows more accurate control of the intensity Iout of reflected light.

Since Roff becomes minimum when the resonance wavelength λm1 of the resonator 26 at the time when the voltage is not applied is equal to the wavelength of laser, the on-off ratio can be set high. Hence, it is preferable that the resonator 26 be so formed that the resonance wavelength 1 m at the time when the voltage is not applied is equal to the wavelength of incoming laser light.

However, as described above, the resonance wavelength λm of the resonator 26 is given by Equation 1 and therefore it is proportional to the thickness t of the light modulating film 34. Accordingly, if the thickness t varies by 1%, the resonance wavelength λm will vary by 1%, too. Also, since there are cases where the refractive index n of the light modulating film 34 also varies, it is probable that the resonance wavelength λm varies as a result. As a consequence of the variation in resonance wavelength λm, the on-off ratio drops.

As described above, the resonance wavelength λm can be made to vary by applying the voltage to the resonator 26. Thus, it is preferable that the voltage applied to the resonator 26 be adjusted in a manner such that the resonator wavelength λm at the time when the control voltage Vcnt is low-level VL is equal to the wavelength of laser light.

In the light of this, in the light modulating apparatus 20 according to the present embodiment, there is provided a bias unit 24 separately from the control unit 22, so that the resonator wavelength λm is corrected by overlapping a bias voltage Vb with the control voltage Vcnt. Hereinbelow, a description will be given of a structure of the bias unit 24 and a method for setting the bias voltage Vb.

Figure 14:
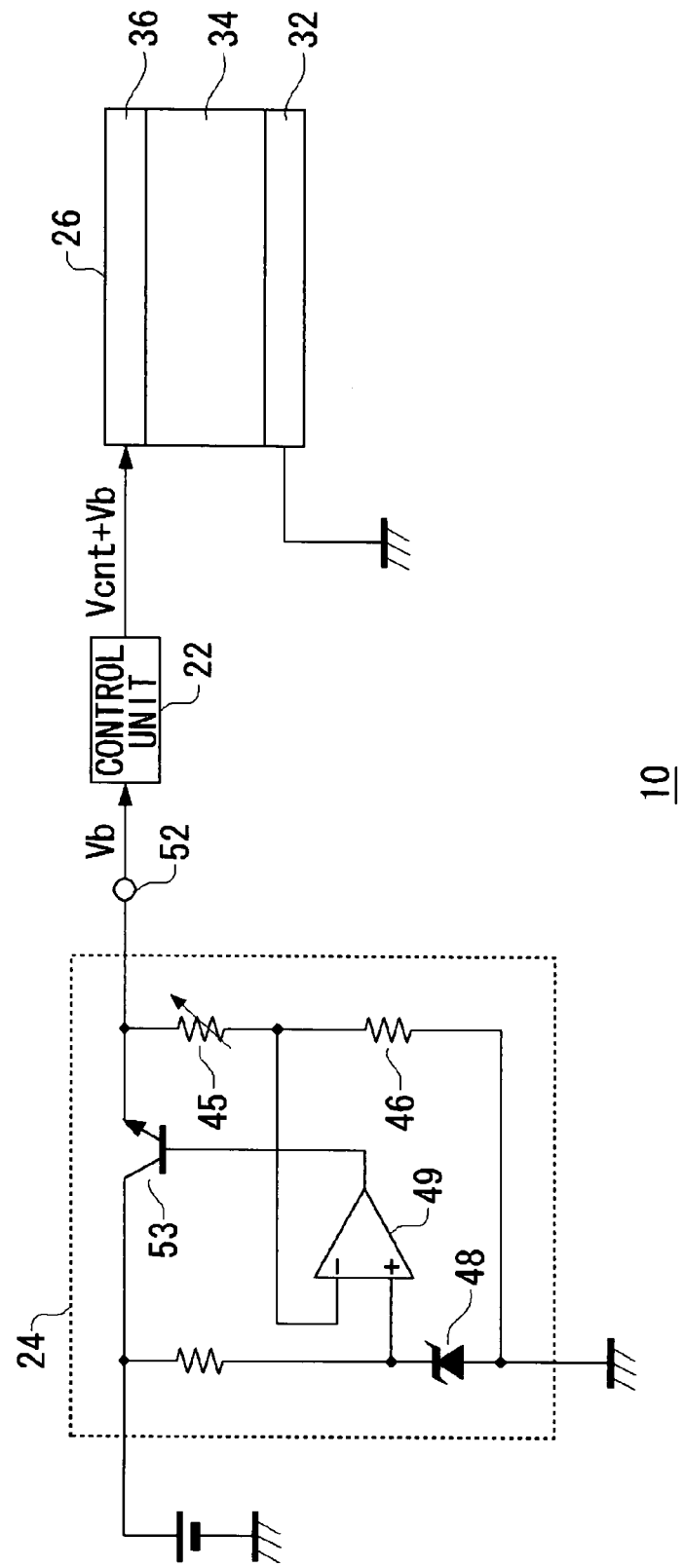
FIG. 14 shows a structure of a light modulating apparatus capable of adjusting a bias voltage Vb.

FIG. 14 shows a structure of a light modulating apparatus 20 capable of adjusting the bias voltage Vb. In the figure, the same components as those in FIG. 12 are given the same reference numerals. Also, for simplicity, components, such as a second reflection layer 40, are omitted.

The bias unit 24 is a constant-voltage circuit that generates the bias voltage Vb. The bias unit 24 includes a variable resistor 45, a resistor 46, a voltage-regulator diode 48, an operational amplifier 49 and a transistor 53.

When the supply voltage is supplied to the bias unit 24, the bias voltage Vb=Vz(1+R1/R2) is output to the output terminal of the bias unit 24. R1 is a resistance value of the variable resistor 45, R2 a resistance value of the resistor 46 and Vz a Zener voltage of the voltage-regulator diode 48. The bias voltage Vb is a constant voltage independent of the value of the supply voltage and can be adjusted by varying the resistance value of the variable resistor 45.

A value of the bias voltage Vb which is suitably added with the control voltage Vcnt can be obtained by measuring the film thickness t of the light modulating film 34. The resonance wavelength λm of a Fabry-Perot resonator is given by Equation 1. Thus, the resonance wavelength $\lambda_m$ of a resonator can be evaluated when the film thickness t of the light modulating film 34 is known. A variation Δn of the light modulating film 34 required to shift the resonance wavelength λm to a target value is obtained from a difference Δλ between the resonance wavelength λm and the target value. Since the relationship in Equation 2 holds between the variation Δn of the light modulating film 34 and an electric field E to be applied, the electric field E required to shift the resonance wavelength λm to the target value can be obtained. Since the electric filed and the voltage are related by a relation E=V/t, a suitable value of the bias voltage Vb applied to the resonator 26 can be obtained.

In this manner, the light modulating apparatus 20 according to the present embodiment, even though the film thickness t of the light modulating film 34 in the resonator 26 varies, a suitable bias voltage Vb can be added with the control voltage Vcnt by adjusting the variable resistor 45 of the bias unit 24 and the resonance wavelength λm can be corrected.

Conventionally, when the light modulating film 34 was to be formed of PLZT or the like, there was the problem that a cost hike was caused because expensive manufacturing equipment was required to enable a manufacture with stable film thickness t and refractive index n thereof. However, as described above, the resonance wavelength λm can be corrected simply and easily by providing the light modulating apparatus 20 with means for adjusting the bias voltage, and thus the yield in the production of the light modulating apparatus 20 can be raised.

As described above, when the voltage is applied to the resonator 26, the resonance wavelength λm shifts in the increasing direction. Since the resonance wavelength λm in a Fabry-Perot resonator is given by Equation 1, the resonance wavelength λm becomes larger as the film thickness increases whereas the resonance wavelength λm becomes smaller as the film thickness decreases. Thus, in the light modulating apparatus 20 according to the present embodiment, it is preferred that the film thickness be so formed as to be thinner than a targeted resonance wavelength λm in order to suitably correct the variation of the film thickness.

The bias unit 24 shown in FIG. 14 is merely an example of the constant-voltage circuit, and the bias voltage Vb may be produced by use of other constant-voltage circuits and regulators. Also, the bias voltage Vb may be set in a manner such that the laser light enters the resonator 26 with the control voltage Vcnt being in the state of low level VL and the variable resistor 45 is adjusted while the intensity of the reflected light is being monitored. Then the variable resistor 45 is adjusted so that the intensity of the reflected light becomes the minimum value. In this case, the resonance wavelength λm can be corrected with high accuracy.

The bias voltage Vb may be automatically set. If an automatic control is performed on the bias voltage Vb, the resonance wavelength λm can be suitably controlled in the event of the characteristics of the light modulating film 34 changes with time or the wavelength of incident laser light changes. For example, the ferroelectric substance such as PLZT is known to have an imprint phenomenon where the amount of polarization produced in the ferroelectric substance, as a result of the electric field being continuously applied to the ferroelectric substance in the same direction, is held in memory.

Figure 15:
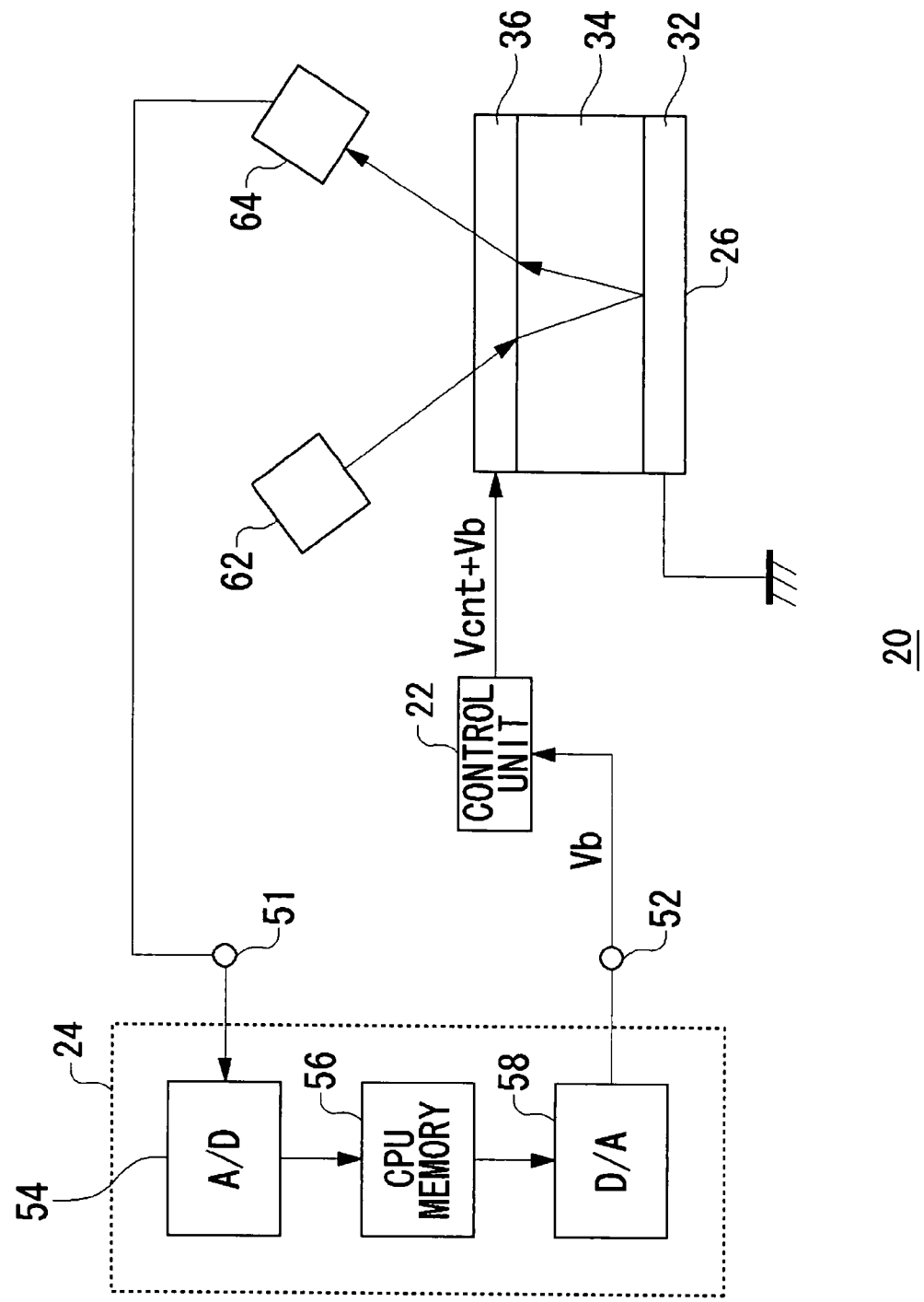
FIG. 15 shows a structure of a light modulating apparatus that sets a bias voltage Vb by an automatic control.

FIG. 15 shows a structure of a light modulating apparatus 20 that sets a bias voltage Vb by an automatic control. A bias unit 24 shown in FIG. 15 includes an A-D conversion unit 54, a CPU memory unit 56 and a D-A conversion unit 58.

An operation of a light modulating apparatus 20 shown in FIG. 15 is described. The light modulating apparatus 20 of FIG. 15 monitors the intensity of light reflected from the resonator 26 and adjusts the bias voltage Vb by performing a feedback control.

The light which is irradiated to a resonator 26 from a laser light source 62 and reflected is converted to electric signals by a light detecting device 64 such as a photodiode or CCD. The light detecting device 64 is provided in a position where the laser light reflected from the resonator 26 can be detected. For example, the reflected light may be split by a not-shown beam splitter so as to be introduced into the light detecting device 64.

The electric signal produced by the light detecting device 64 is inputted to the bias unit 24 from an input terminal 51. The electric signal is converted to a digital value by the A-D conversion unit 54 and delivered to the CPU memory unit 56. The CPU memory unit 56 controls the bias voltage Vb so that the intensity of the light detected by the light detecting device 64 becomes the minimum. The signal output from the CPU memory unit 56 is converted to an analog value by the D-A conversion unit 58, and the bias voltage Vb is output to an output terminal 52.

By performing an automatic control on the bias voltage Vb, the resonance wavelength λm can be so controlled as to be a value constantly equal to the wavelength of the laser light source 63.

The bias unit 24 shown in FIG. 15 may be formed by integrating it into the substrate 30 shown in FIG. 12. To constitute a reflection-type modulator, the light modulating apparatus 20 according to the present embodiment can use opaque material as the substrate 30. For example, when the silicon is used as the substrate 30, the control unit 22 and the bias unit 24 are formed on the substrate 30, so that the light modulating apparatus 20 can be turned into a single chip as a semiconductor integrated circuit device.

Figure 16:
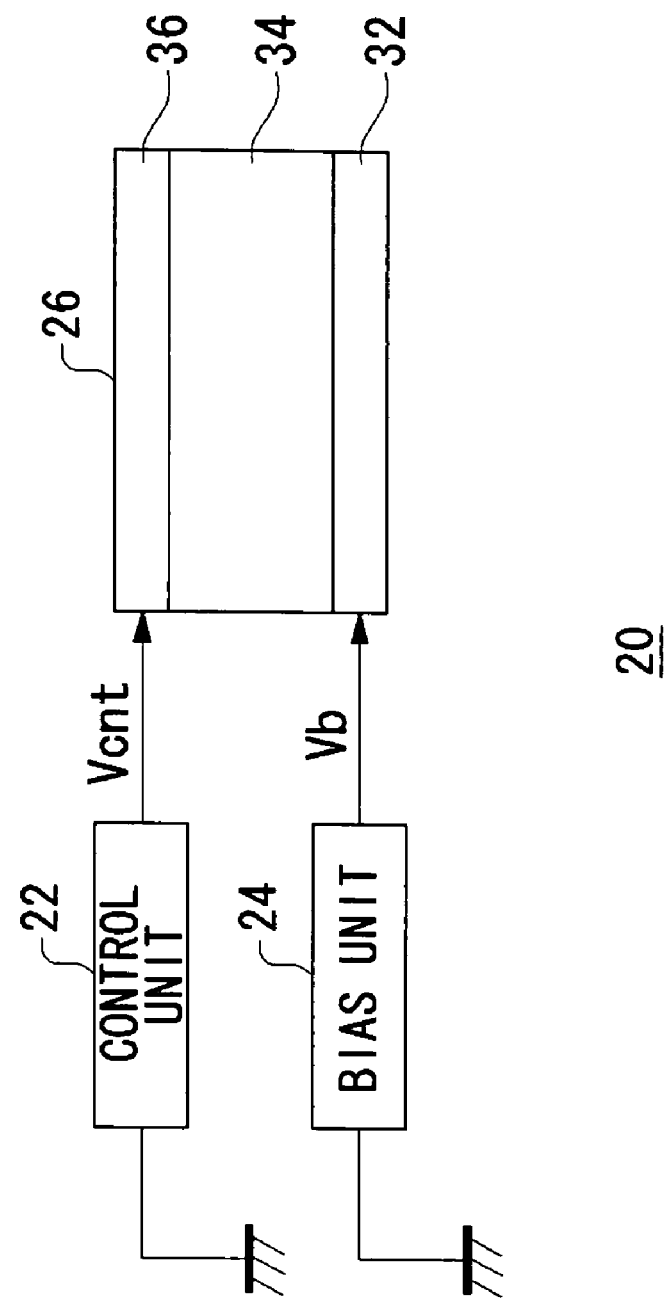
FIG. 16 shows a structure of a light modulating apparatus where a bias unit is applied to a first reflection layer.

In the light modulating apparatus 20 according to the above-described present embodiment, the bias voltage Vb is added with the control voltage Vcnt and then applied to the transparent electrode 36. However, the resonance wavelength λm may be adjusted by applying the bias voltage Vb to the first reflection layer 32. FIG. 16 shows a structure of a light modulating apparatus where a bias unit 24 is applied to a first reflection layer 32.

When the bias voltage Vb is applied to the first reflection layer 32, the voltage applied to the resonator 26 becomes Vcnt-Vb. Hence, the bias voltage Vb is set to a negative voltage.

Suppose that the negative bias voltage Vb is applied. A negative voltage is applied to the light modulating film 34 when the control voltage Vcnt is low-level VL. In a case where the light modulating film 34 is formed of PLZT where the refractive index changes in proportion to the square of the electric field applied, the shift in the resonance wavelength λm does not depend on the polarity of the voltage applied. Hence, in this time, too, the resonance wavelength λm can be controlled by adjusting the bias voltage Vb.

In the case of light modulating apparatus shown in FIG. 16, the operating voltage of the light modulating apparatus 20 can be lowered further as compared to the case of adding the bias voltage Vb to the control voltage Vcnt.

The light modulating apparatus according to the present embodiment may include a plurality of resonators and controls units. For instance, the light modulating apparatus 20 shown in FIG. 12 may be arranged in a matrix, so as to form a spatial light modulating apparatus.

Figure 17A:
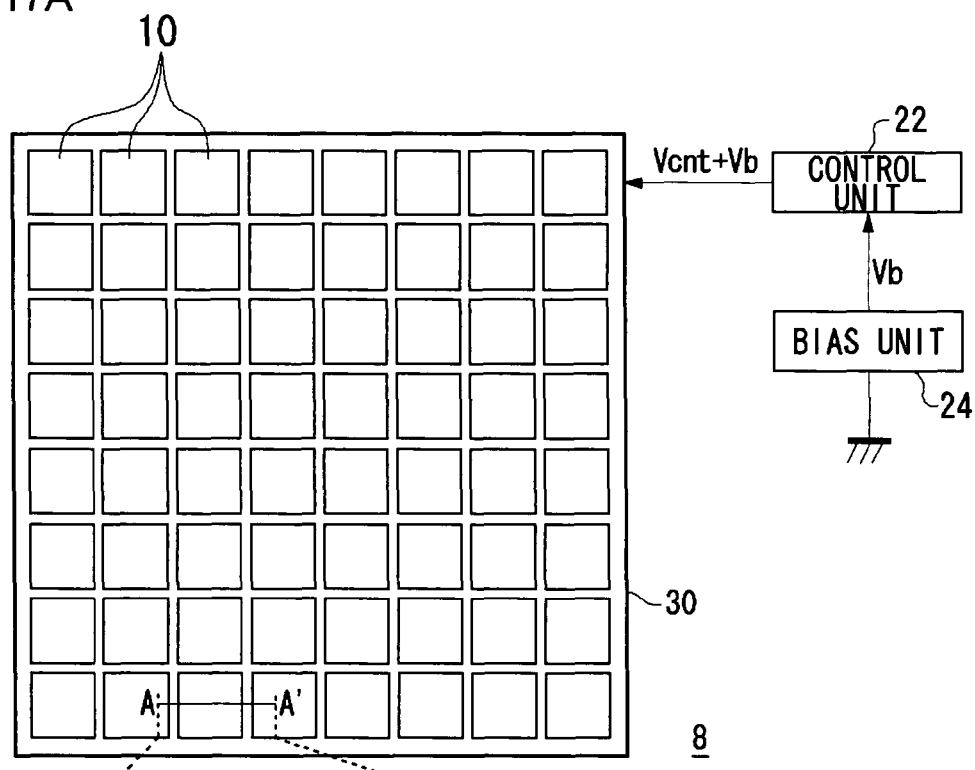
FIGS. 17A and 17B show a spatial light modulating apparatus where a light modulating apparatus is arranged in a matrix.
Figure 17B:
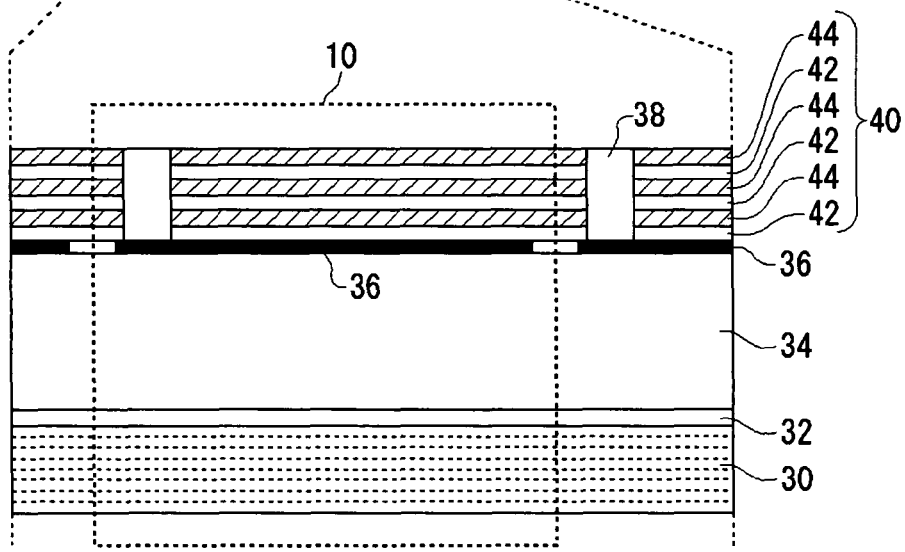

FIGS. 17A and 17B are illustrations showing a spatial light modulating apparatus where a light modulating apparatus is arranged in a matrix. FIG. 17A shows a plan view of a spatial light modulating apparatus 8. The spatial light modulating apparatus 8 is provided with a plurality of pixels 10 which are arranged two-dimensionally in eight rows and eight columns on a substrate 30. Each pixel 10 is structured in a size of about 20 μm×20 μm.

FIG. 17B shows an A-A' cross-sectional view of a spatial light modulating apparatus shown in FIG. 17A. The components, such as a light modulating film 34, are the same as those of a resonator 26 as shown in FIG. 12.

As shown in FIG. 17B, a transparent electrode 36 is led to the outside through via holes and wiring 38. As material for the wiring 38, Al or the like is used preferably. On the top surface of the wiring 38, a protective film may further be formed.

In the spatial light modulating apparatus 8, control voltages Vcnt from a control unit 22 are applied to each pixel 10, and the reflectance can be controlled for each pixel 10.

The bias unit 24 superposes a bias voltage Vb on a control voltage Vcnt. The structure of the bias unit 24 and the setting method of the bias voltage Vb are the same as the structure and the setting method as described earlier. Where there is little variation in film thickness between the pixels 10 in a spatial light modulating apparatus 8, a bias voltage Vb common to all the pixels 10 may be superimposed, so that at least one bias unit 24 is enough for a single spatial light modulating apparatus 8.

A bias unit 24 may be provided for each of the pixels 10. In such a case, the resonance wavelength km can be corrected with higher accuracy.

Figure 18:
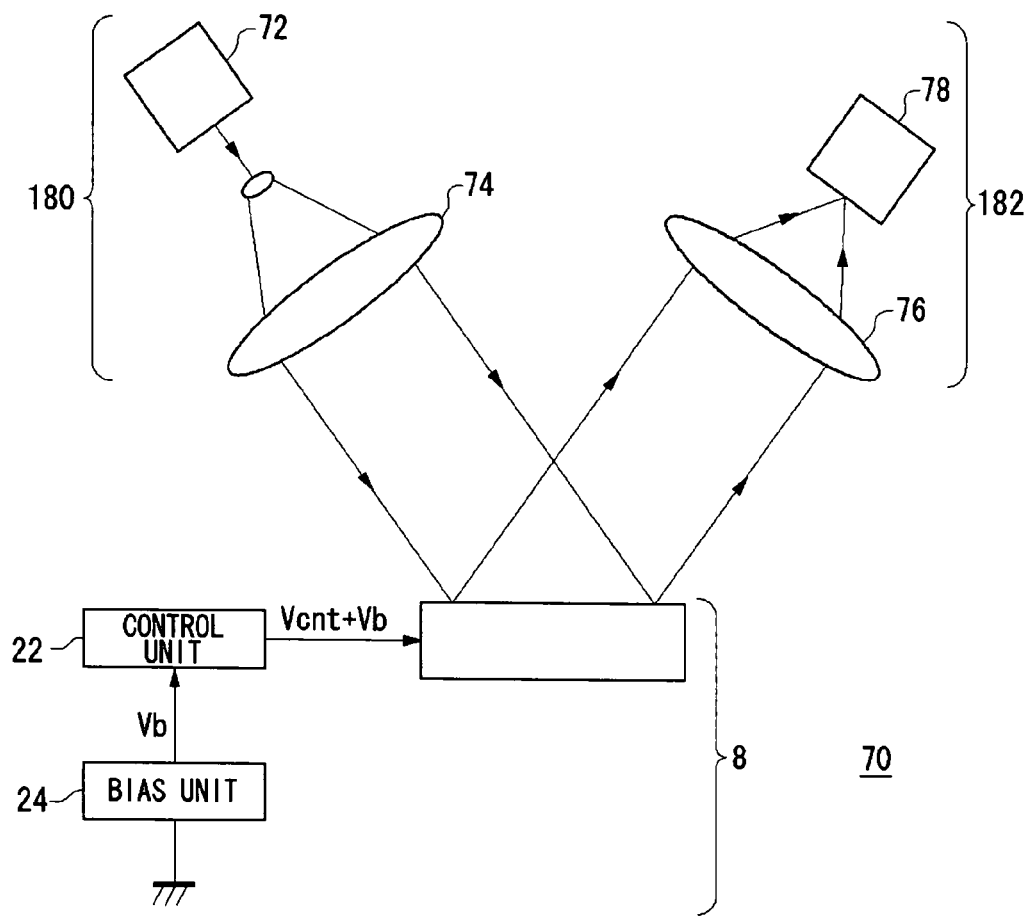
FIG. 18 shows a hologram recording apparatus using a spatial light modulating apparatus.

A variety of light modulating systems can be structured using a spatial light modulating apparatus 8. FIG. 18 is an illustration showing a hologram recording apparatus 70 using a spatial light modulating apparatus 8. The hologram recording apparatus 70 is provided with a light emitting unit 180, a light receiving unit 182, and a spatial light modulating apparatus 8. The light emitting unit 180 is provided with a laser light source 72 and a beam expander 74. The light receiving unit 182 is provided with a Fourier transform lens 76 and a recording medium 78.

In the hologram recording apparatus 70, laser light emitted from the laser light source 72 is split into two beams of light by a not-shown beam splitter. One of the beams of light, which is used as reference light, is led into a recording medium 78. The other of the beams of light undergoes an enlargement of beam diameter by the beam expander 74 and is irradiated to the spatial light modulating apparatus 8 as parallel light.

The light irradiated to the spatial light modulating apparatus 8 is reflected from the spatial light modulating apparatus 8 as signal light which has different intensities for different pixels. This signal light is subjected to a Fourier transform as it passes through the Fourier transform lens 76 and is focused into the recording medium 78. Inside the recording medium 78, the light paths of the signal light containing a hologram pattern and the reference light cross each other to form an optical interference pattern. The whole interference pattern is now recorded as a change in refractive index (refractive index grating) in the recording medium 78.

In the above description, a description has been given of a case where a spatial light modulating apparatus 8 is used in a hologram recording apparatus 70, but this should not be considered as limiting. It may be used in display apparatuses, optical communication switches, optical communication modulators, optical arithmetic units, encryption circuits, etc.

In this embodiment, a description has been given of a case where PLZT as an electro-optical material whose refractive index changes in proportion to the square of applied electric field is used as the material for the light modulating film 34, but the light modulating film may be formed using an electro-optical material whose refractive index changes in proportion to applied electric field.

Known as such electro-optical materials are, for instance, $LiNbO_3$ (lithium niobate), $LiTaO_3$ (lithium tantalate), and SBN (strontium barium niobate).

When an electro-optical material whose refractive index changes in proportion to applied electric field is used, the direction in which the resonance wavelength $\lambda_m$ shifts can be reversed by changing the polarity of the voltage applied to the resonator. If the bias unit is so structured as to be able to adjust the polarity of the bias voltage Vb to either of positive and negative, then the resonance wavelength λm can be adjusted suitably even when there is variation of the film thickness t from the target value. That is, when the film thickness t is thicker than the target value and the resonance wavelength λm is shifting to a larger value, a negative voltage may be applied. On the other hand, when the film thickness t is thinner than the target value and the resonance wavelength λm is shifting to a smaller value, a positive voltage may be applied.

The fourth embodiment has been described as above. This embodiment is merely exemplary and it is understood by those skilled in the art that various modifications to the combination of each component and process thereof are possible and such modifications are also within the scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A light control apparatus, comprising:
a substrate;
a first reflection layer provided on said substrate;
a light modulating film, provided on said first reflection layer, whose refractive index is controlled by an electric field applied thereto;
a second reflection layer provided on said light modulating film; and
a pair of electrodes which applies the electric field to said light modulating film,
wherein said second reflection layer has a laminated structure including a plurality of dielectric films whose refractive indices differ, and
wherein at least one of the plurality of dielectric films is a silicon dioxide film, and wherein at least one of the plurality of dielectric films is a silicon nitride film.

2. A light control apparatus according to claim 1, further comprising a transparent electrode provided between said light modulating film and said second reflection layer,
wherein said transparent electrode and said first reflection layer form said pair of electrodes.

3. A light control apparatus according to claim 1, wherein a reflectance of said first reflection layer is approximately the same as that of said second reflection layer.

4. A light control apparatus according to claim 1, wherein said light modulating film is made of electro-optical material whose refractive index changes in proportion to the square of the electric field applied.

5. A light control apparatus according to claim 4, wherein said electro-optical material is lead zirconate titanate or lead lanthanum zirconate titanate.

6. A light control apparatus according to claim 5, wherein the thickness of the lead lanthanum zirconate titanate is in a range of 500 nm to 1500 nm.

7. A light control apparatus according to claim 1, wherein said pair of electrodes is arranged in plurality in a matrix.

8. A light control apparatus of a reflection type structured to reflect back incident light under control, the light control apparatus comprising:
a substrate;
a first reflection layer provided on said substrate, the first reflection layer serving as a first electrode;
a light modulating film, provided on said first reflection layer, whose refractive index is controlled by an electric field applied thereto;
a transparent layer serving as a second electrode provided on said modulating film; and
a second reflection layer provided on said transparent layer,
wherein the first and second electrodes apply the electric field to said light modulating film.

9. A light control apparatus comprising:
a substrate;
a first reflection layer of non-transparent type provided on said substrate, the first reflection layer serving as a first electrode;
a light modulating film, provided on said first reflection layer, whose refractive index is controlled by an electric field applied thereto;
a transparent layer serving as a second electrode provided on said modulating film; and
a second reflection layer provided on said transparent layer,
wherein the first and second electrodes apply the electric field to said light modulating film.

10. A light control apparatus according to claim 9, wherein said first reflection layer is made of metal.

11. A light control apparatus, comprising:
a substrate;
a first reflection layer provided on said substrate;
a light modulating film, provided on said first reflection layer, whose refractive index is controlled by an electric field applied thereto;
a second reflection layer provided on said light modulating film; and
a pair of electrodes which applies the electric field to said light modulating film,
wherein said second reflection layer has a laminated structure including a plurality of dielectric films whose refractive indices differ, and
wherein at least one of the plurality of dielectric films is a silicon nitride film.

12. A light control apparatus according to claim 8, wherein said light modulating film is made of electro-optical material whose refractive index changes in proportion to the square of the electric field applied.

13. A light control apparatus according to claim 8, wherein said pair of electrodes is arranged in plurality in a matrix.

14. A light control apparatus according to claim 9, wherein said light modulating film is made of electro-optical material whose refractive index changes in proportion to the square of the electric field applied.

15. A light control apparatus according to claim 9, wherein said pair of electrodes is arranged in plurality in a matrix.

16. A light control apparatus according to claim 11, further comprising a transparent electrode provided between said light modulating film and said second reflection layer,
wherein said transparent electrode and said first reflection layer form said pair of electrodes.

17. A light control apparatus according to claim 11, wherein a reflectance of said first reflection layer is approximately the same as that of said second reflection layer.

18. A light control apparatus according to claim 11, wherein said pair of electrodes is arranged in plurality in a matrix.

19. A light control apparatus according to claim 8, wherein said second reflection layer has a laminated structure including a plurality of dielectric films whose refractive indices differ, and wherein at least one of the plurality of dielectric films is a silicon nitride film.

20. A light control apparatus according to claim 9, wherein said second reflection layer has a laminated structure including a plurality of dielectric films whose refractive indices differ, and wherein at least one of the plurality of dielectric films is a silicon nitride film.

* * * * *